US009524471B2

(12) United States Patent
Narisetty et al.

(10) Patent No.: US 9,524,471 B2
(45) Date of Patent: Dec. 20, 2016

(54) SYSTEMS AND METHODS FOR CONFLICT RESOLUTION AND STABILIZING CUT GENERATION IN A MIXED INTEGER PROGRAM SOLVER

(71) Applicant: SAS Institute Inc., Cary, NC (US)

(72) Inventors: Amar K. Narisetty, Youngstown, NY (US); Philipp M. Christophel, Raleigh, NC (US); Yan Xu, Cary, NC (US)

(73) Assignee: SAS Institute Inc., Cary, NC (US)

( * ) Notice: Subject to any disclaimer, the term of this patent is extended or adjusted under 35 U.S.C. 154(b) by 236 days.

(21) Appl. No.: 14/068,581

(22) Filed: Oct. 31, 2013

(65) Prior Publication Data

US 2014/0122390 A1    May 1, 2014

Related U.S. Application Data

(60) Provisional application No. 61/720,608, filed on Oct. 31, 2012, provisional application No. 61/780,751, filed on Mar. 13, 2013.

(51) Int. Cl.
*G06N 99/00* (2010.01)
*G06F 17/11* (2006.01)

(52) U.S. Cl.
CPC ............. *G06N 99/005* (2013.01); *G06F 17/11* (2013.01)

(58) Field of Classification Search
None
See application file for complete search history.

(56) References Cited

U.S. PATENT DOCUMENTS

2009/0182814 A1* 7/2009 Tapolcai et al. ............. 709/205

OTHER PUBLICATIONS

"Integer-Programming Software Systems", A. Atamturk, Martin W. P. Savelsbergh, Department of Industrial Engineering and Operations Research, University of California, 2004, 68 pages.*
"New Computational Approaches to the Solution of Mixed Integer Programs", Dissertation, Purdue University, Dec. 2012, 170 pages.*

(Continued)

*Primary Examiner* — Wilbert L Starks
*Assistant Examiner* — Mai T Tran
(74) *Attorney, Agent, or Firm* — Kilpatrick Townsend & Stockton LLP

(57) ABSTRACT

Systems and methods for conflict resolution and stabilizing cut generation in a mixed integer linear program (MILP) solver are disclosed. One disclosed method includes receiving a mixed integer linear problem (MILP), the MILP having a root node and one or more global bounds; pre-processing the MILP, the MILP being associated with nodes; establishing a first threshold for a learning phase branch-and-cut process; performing, by one or more processors, the learning phase branch-and-cut process for nodes associated with the MILP, wherein performing the learning phase branch-and-cut process includes: evaluating the nodes associated with the MILP, collecting conflict information about the MILP, and determining whether the first threshold has been reached; responsive to reaching the first threshold, removing all of the nodes and restoring a root node of the MILP; and solving, with the one or more processors, the MILP using the restored root node and the collected conflict information.

40 Claims, 14 Drawing Sheets

(56) References Cited

OTHER PUBLICATIONS

Achterberg, "Conflict Analysis in Mixed Integer Programming" www.zib.de/projects/integer-optimization/MIP ZIB-Report 05-19 (Aug. 2005).
Kilinc Karzan et al., "Information-based branching schemes for binary linear mixed integer problems" Math. Prog. Comp. (2009) pp. 249-293.
Fischetti, et al., "A Relax-Cut Framework for Gomory's Mixed-Integer Cuts" DEI, University of Padova, Italy, (undated) 23 pages.

* cited by examiner

US 9,524,471 B2

SYSTEMS AND METHODS FOR CONFLICT RESOLUTION AND STABILIZING CUT GENERATION IN A MIXED INTEGER PROGRAM SOLVER

CROSS-REFERENCES TO RELATED APPLICATION

This application claims the benefit of priority under 35 U.S.C. §119(e) to U.S. Provisional Patent Application No. 61/720,608, filed Oct. 31, 2012, entitled "Conflict Search in a MILP Solver," and U.S. Provisional Patent Application No. 61/780,751, filed Mar. 13, 2013, entitled "Methods for Stabilizing Cut Generation in a Mixed Integer Program Solver," the entirety of both of which are hereby incorporated by reference in their entirety.

FIELD

The present application generally relates to solving mixed integer linear problems, and more specifically relates to systems and methods for conflict resolution and stabilizing cut generation in a mixed integer program solver.

BACKGROUND

Linear programming is a technique of determining an optimal solution to a set of defined constraints, which are represented as linear equalities or inequalities. Different classes of linear programs exist, including integer linear programs (IPs or ILPs) and mixed integer linear programs (MIPs or MILPs). Integer linear programs are those in which decision variables have to take integral values and satisfy the set of constraints, while MILPs have some decision variables that need to take integral values and some decision variables that can take on fractional values.

SUMMARY

Systems and methods for conflict resolution and stabilizing cut generation in a mixed integer program solver are disclosed herein.

Systems and methods for conflict resolution and stabilizing cut generation in a mixed integer program solver are disclosed herein. One disclosed method includes the steps of receiving a mixed integer linear problem (MILP), the MILP having a root node and one or more global bounds; pre-processing the MILP, the MILP being associated with nodes; establishing a first threshold for a learning phase branch-and-cut process; performing, by one or more processors, the learning phase branch-and-cut process for nodes associated with the MILP, wherein performing the learning phase branch-and-cut process includes: evaluating the nodes associated with the MILP, collecting conflict information about the MILP, and determining whether the first threshold has been reached; responsive to reaching the first threshold, removing all of the nodes and restoring a root node of the MILP; and solving, with the one or more processors, the MILP using the restored root node and the collected conflict information. In another embodiment, a computer-readable medium comprises program code for causing a processor to carry out such a method.

Another disclosed method includes the steps of receiving, by one or more processors, a mixed integer linear problem (MILP), the MILP having one or more objectives; analyzing, by one or more processors, the MILP to determine an initial linear problem (LP) solution, the analyzing includes determining whether the initial LP solution is non-optimal; responsive to determining the initial LP solution is non-optimal, generating, by one or more processors, a sub-MILP of the MILP; determining, by one or more processors, one or more objectives of the sub-MILP, each of the one or more objectives being different from the one or more objectives of the MILP; generating, by one or more processors, cuts based on the one or more objectives of the sub-MILP; analyzing, by one or more processors, the sub-MILP based on the cuts to determine a new LP solution and new bounds; determine the new LP solution and the new bounds; and solving, by one or more processors, the MILP based on the cuts and the new bounds. In another embodiment, a computer-readable medium comprises program code for causing a processor to carry out such a method This illustrative embodiment is mentioned not to limit or define the disclosed subject matter, but rather to provide an example to aid understanding thereof. Illustrative embodiments are discussed in more detail below in the Detailed Description.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of some embodiments.

DETAILED DESCRIPTION

Figure 1A:
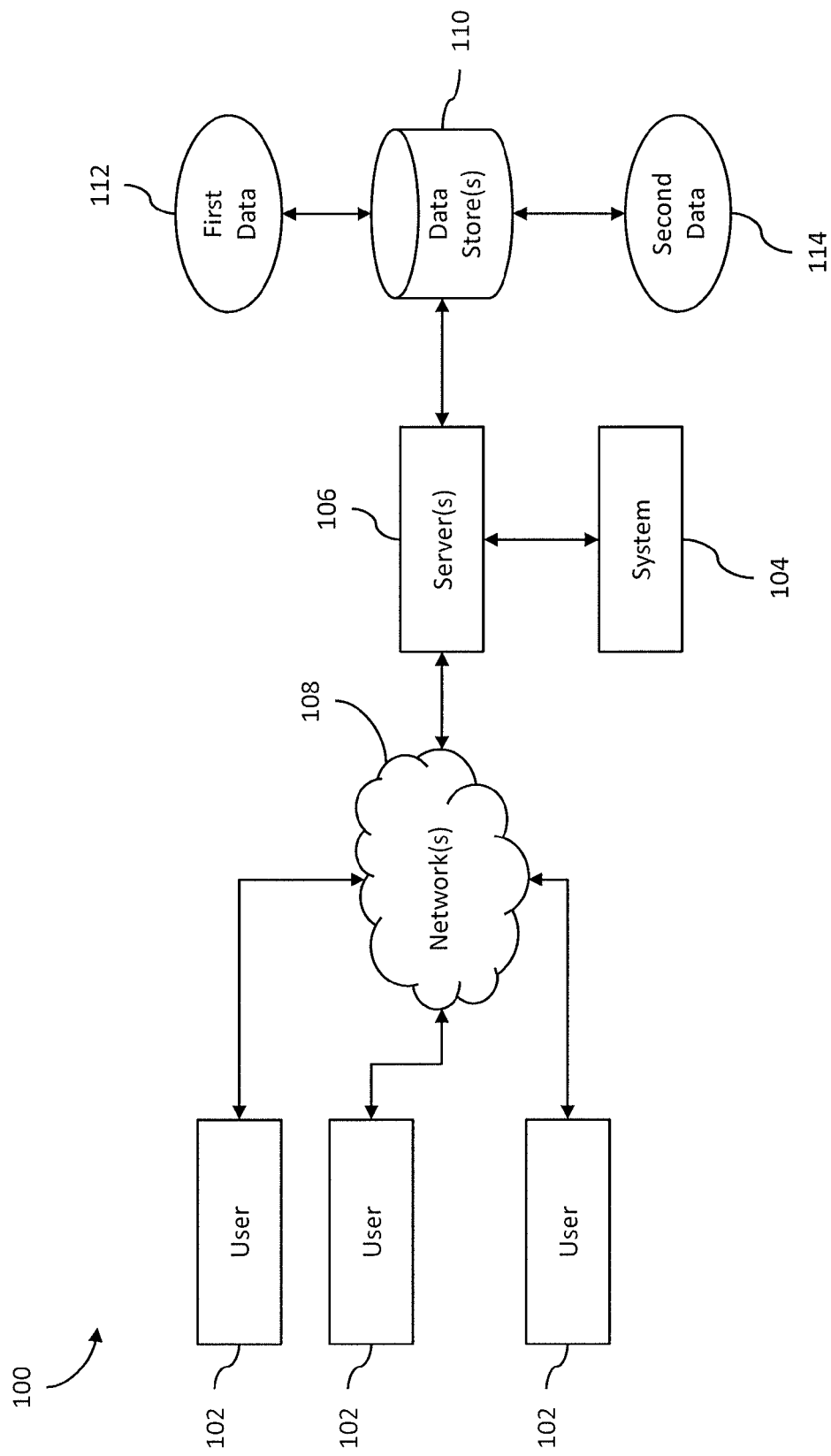
FIGS. 1A-C and 2 show examples of systems for conflict resolution and stabilizing cut generation in a mixed integer program solver according to embodiments of this disclosure.

Example embodiments are described herein in the context of systems and methods for conflict resolution and stabilizing cut generation in a mixed integer program solver. Those of ordinary skill in the art will realize that the following description is illustrative only and is not intended to be in any way limiting. Other embodiments will readily suggest themselves to such skilled persons having the benefit of this disclosure. Reference will now be made in detail to implementations of example embodiments as illustrated in the accompanying drawings. The same reference indicators will be used throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

It has been shown that MILPs are NP-hard problems and thus, as a class, are computationally expensive to solve using brute-force approaches. As a result, more efficient methods have been developed to solve MILPs, such as branch-and-cut and branch-and-bound methods. However, these methods may still be computationally expensive and can take significant amounts of time to find a solution to a MILP.

Illustrative Method for Conflict Resolution in a Mixed Integer Program Solver

In one illustrative embodiment, a MILP solver receives a MILP to solve. The MILP solver is configured to apply a branch-and-cut method to solve the MILP; however, the MILP solver is first configured to gather information about the MILP to reduce the complexity of the solution space and to provide a simpler problem to the branch-and-cut method. In this illustrative embodiment, the MILP solver is divided into two phases, an information gathering phase (learning phase) and a solver phase (application phase). In this illustrative embodiment, the application phase is a branch-and-cut solver, but note that in some embodiments, the solver phase may employ methods other than branch-and-cut.

In the learning phase, the MILP solver is provided information-gathering threshold information, such as a number of nodes to process or a number of conflict clauses to identify. Once the thresholds have been established, the MILP solver begins the learning phase, which involves a learning phase branch-and-cut process. The MILP solver performs initial processing on the MILP to reduce complexity in the MILP (such as eliminating redundant constraints) or by performing an initial LP solve to determine if an optimal solution can be easily identified. In the learning phase, the MILP solver employs a branch-and-cut process to process nodes within a solution space for the MILP, where each node represents a subset or subsets of possible solutions; however, unlike a traditional branch-and-cut process, for each processed node at which an infeasibility (or conflict) is identified, rather than simply cutting the node, the conflict is analyzed to identify the basis for the conflict. The information gathered about the conflict is then saved for subsequent use, and the node is then cut. The learning phase process continues to process nodes within the solution space and gather information, such as conflict clauses or nodes to cut, until it reaches one of the established thresholds. For example, if the maximum number of nodes to process in the learning phase is 1000, the learning phase process will halt after it processes its $1000^{th}$ node, irrespective of how much information has been gathered. Alternatively, if the conflict clause threshold is set to 250, once 250 conflict clauses have been identified, the learning phase process will halt.

After the learning phase completes, the remaining nodes are cut, the root node of the MILP is restored, improved bounds and conflict clauses from the learning phases are applied to the MILP, and any cuts generated at leaf nodes during the learning phase are applied at the root node. After these preparations are made, the application phase process begins. In this case, the application phase is a branch-and-cut process as well. However, unlike a traditional branch-and-cut process, the application phase is supplied with the information gathered during the learning phase. For example, information about conflict clauses or cut nodes may be provided to the application phase process. The application phase process then uses this gathered information to more efficiently search the solution space to identify an optimal solution to the MILP.

By using a two-phase approach to solving a MILP, a branch-and-cut process may operate more efficiently to solve the MILP by using information gathered from an initial phase.

Figure 2:
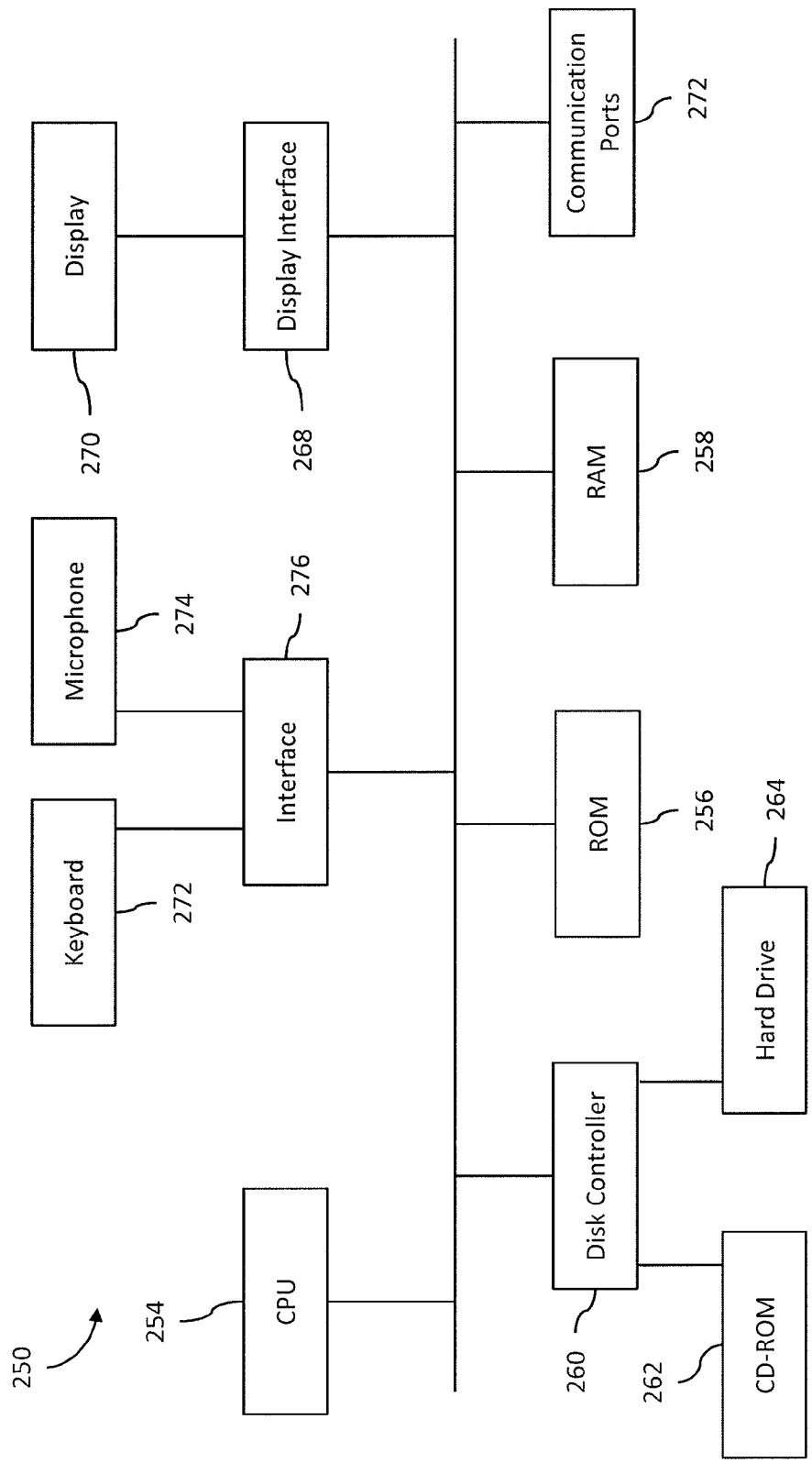
Figure 3:
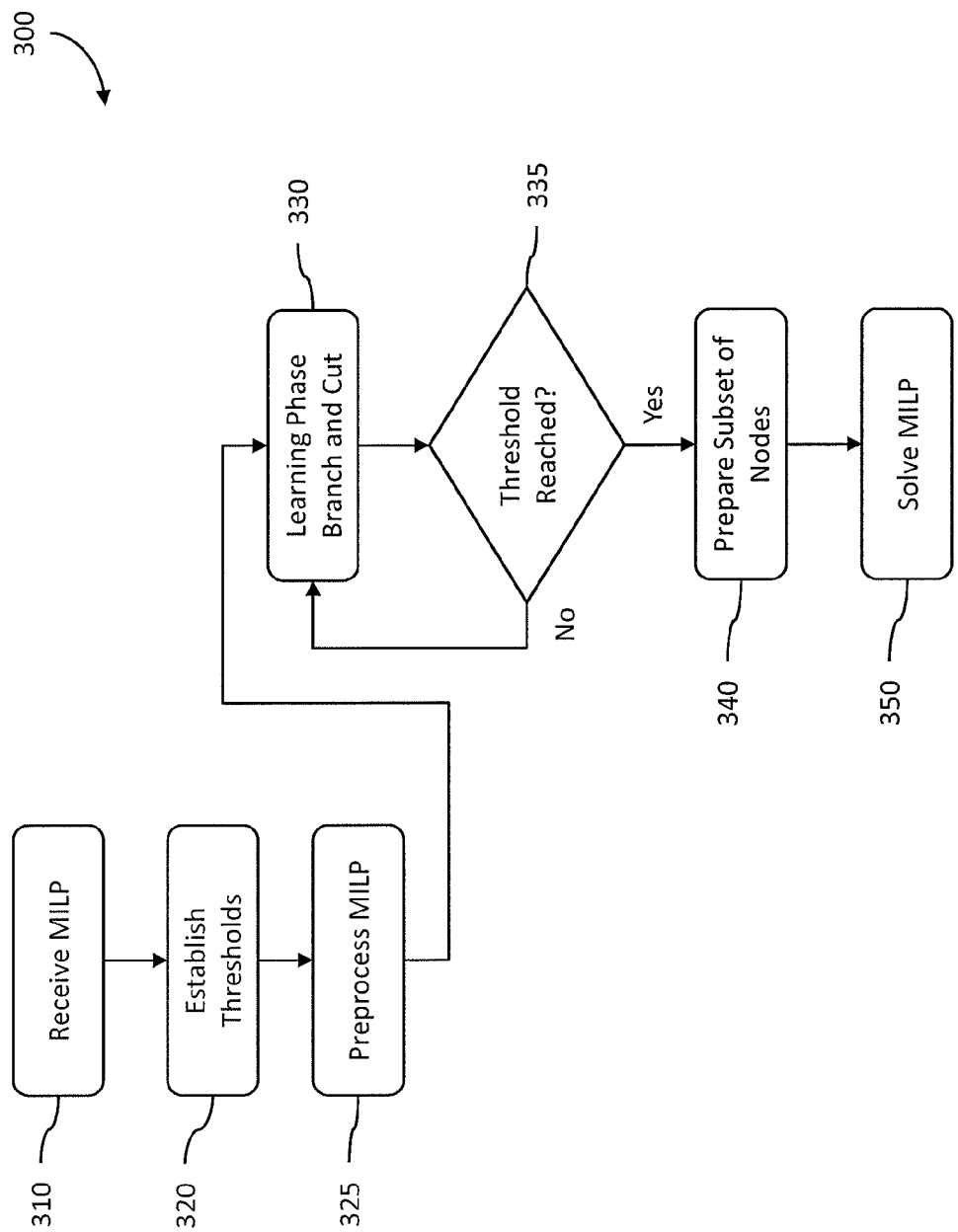
FIGS. 3, 4, and 5A show examples of methods for conflict resolution in a mixed integer program solver according to embodiments of this disclosure.

Referring now to FIG. 3, FIG. 3 shows a method 300 for conflict resolution in a mixed integer program solver according to an embodiment of this disclosure. The method 300 shown in FIG. 3 may be performed by one or more of the systems shown in FIGS. 1A-C or 2, or by other systems according to the scope of this disclosure. Embodiments according to the method 300 shown in FIG. 3 may be incorporated into software, such as according to the software architecture shown in FIGS. 5B-C, and discussed in more detail below.

The method 300 begins in block 310 when a MILP is received. For example, a MILP may be provided on a computer-readable medium connected to or inserted into a computer system. In some embodiments, a MILP may be received from a remote computer over a communications link, or may be received from one or more users working at terminals. After the MILP has been received, the method 300 proceeds to block 320.

In block 320, one or more thresholds are established. For example, as discussed above, two thresholds may be established, a first threshold specifying the maximum number of nodes to process and a second threshold specifying the maximum number of conflict clauses to collect. In some embodiments, only one threshold may be used. For example, some embodiments may establish a threshold only for the maximum number of conflict clauses or the maximum number of nodes to process. In some embodiments, other thresholds may be used. For example, thresholds that specify the maximum amount of processing time or maximum amount of actual time spent may be established. In some embodiments, thresholds may specify a minimum value, such as a minimum number of conflict clauses to identify or a minimum number of nodes to process. For thresholds relating to a particular count, such as a number of nodes evaluated (whether a minimum or maximum threshold is specified) or an amount of processing time used, a counter is established corresponding to each such threshold. For thresholds relating to the passage of time, a "start" time may be stored and subsequently referenced to determine the amount of time that has passed. After one or more thresholds have been established, the method 300 proceeds to block 325.

In block 325, the MILP undergoes preprocessing. For example, in one embodiment, block 325 performs processes, such as presolving the MILP, performing an initial LP solve on the MILP, or running heuristics and generating initial cuts for the MILP. Such pre-processing steps may be known and are not discussed in detail here. However, such preprocessing may be used to eliminate redundant constraints in a MILP or may be able to quickly identify an optimal solution to the MILP. After preprocessing the MILP, the method proceeds to block 330.

In block 330, a learning phase branch-and-cut process ("learning phase process") is executed. During the learning phase process, a modified branch-and-cut process is executed to attempt to solve the MILP. Unlike a conventional branch-and-cut process, during the learning phase process, conflict information can be generated and collected for subsequent use in the application phase branch-and-cut process performed in block 350. The learning phase process will be described in more detail with respect to FIGS. 4 and 5A below. However, at a high-level, as the learning phase process processes each node of the MILP, if the node is infeasible and should be cut, rather than simply cutting the node, conflict information, such as the reason for the infeasibility, is determined and collected, as well as other information, such as improved bound information. After the conflict information has been collected, the node is cut, after which, the learning phase branch-and-cut process continues to the next node.

In addition to collecting conflict information, the learning phase process 330 differs from a conventional branch-and-cut process in other aspects at least because the learning phase process only executes for a limited number of iterations before terminating, even if an optimal solution to the MILP has not been identified. One or more thresholds are established and applied to the learning phase process 330 such that, once one or more of the thresholds has been reached, a determination made in block 335, the learning phase process terminates. Depending on the established threshold(s), the determination may be made after each node is processed, or at any other appropriate time during execution of the learning phase branch-and-cut process. After a threshold has been reached in block 335, the method proceeds to block 340.

In block 340, a subset of nodes is prepared for the application phase branch-and-cut process ("application phase process"). To do so, the branch-and-cut process is restarted, by first pruning all nodes and restoring the root node. Next, the conflict information collected during the application phase are applied to the root node, including updating the global bounds of the MILP using the information obtained from the learning phase process, and applying cuts that were generated at leaf nodes during the learning phase process to the root node. Thus, the learning phase process further refines the MILP to be solved. As with the learning phase process, additional preprocessing steps may be performed at the beginning of the application phase process, including presolve, performing an initial LP solve, and performing heuristics and generating additional cuts. Once the subset of nodes is prepared for the application phase process, the method proceeds to block 350.

In block 350, the application phase process solves the MILP based on the restored root node and the collected information. The application phase process shown in FIG. 3 is configured to perform a conventional branch-and-cut process on the MILP, using the collected conflict information. Unlike the learning phase process, in this embodiment, the application phase process does not collect conflict information and is not bounded by thresholds. Thus, the application phase branch-and-cut process executes as a conventional branch-and-cut process.

Figure 4:
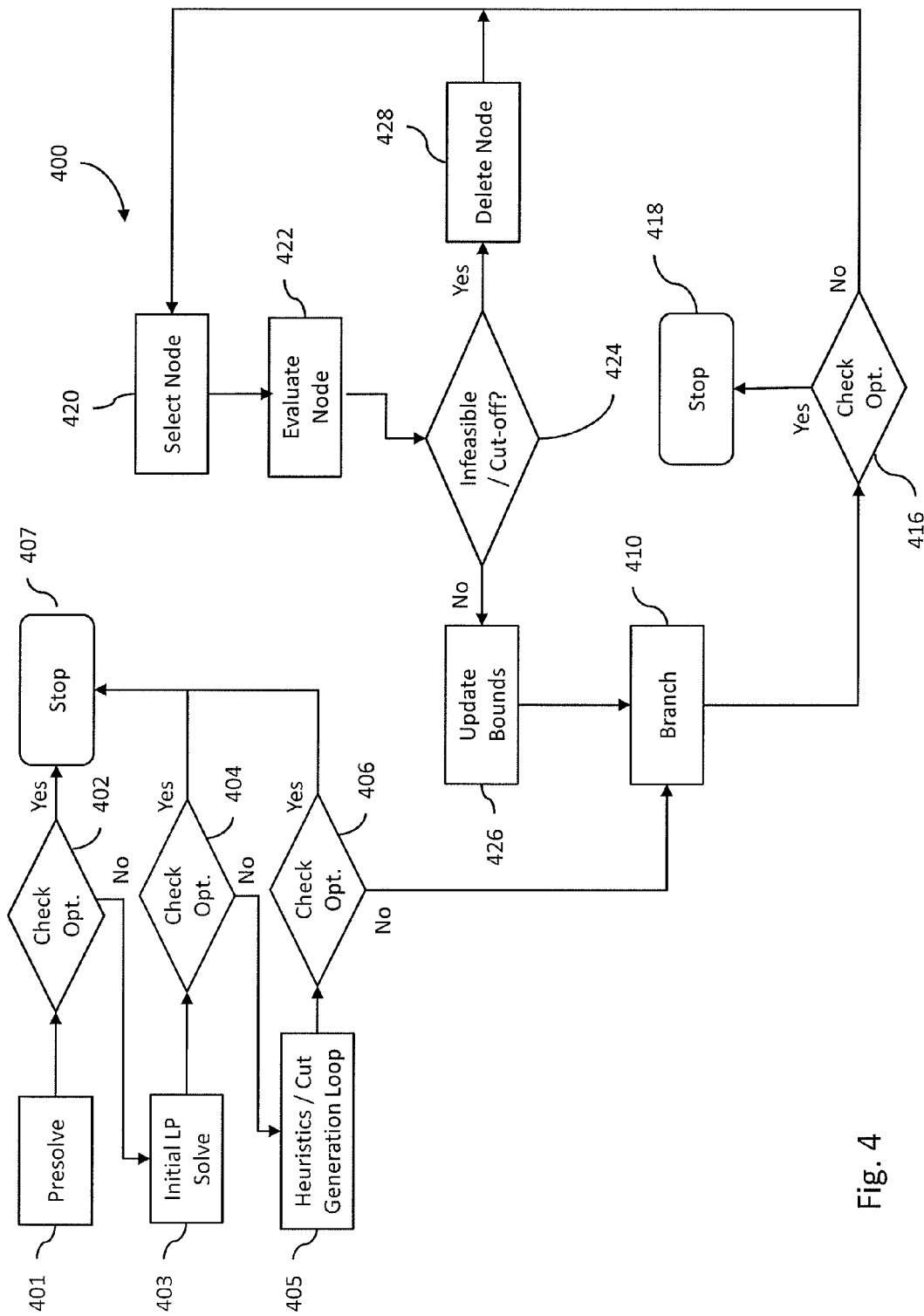
Figure 5A:
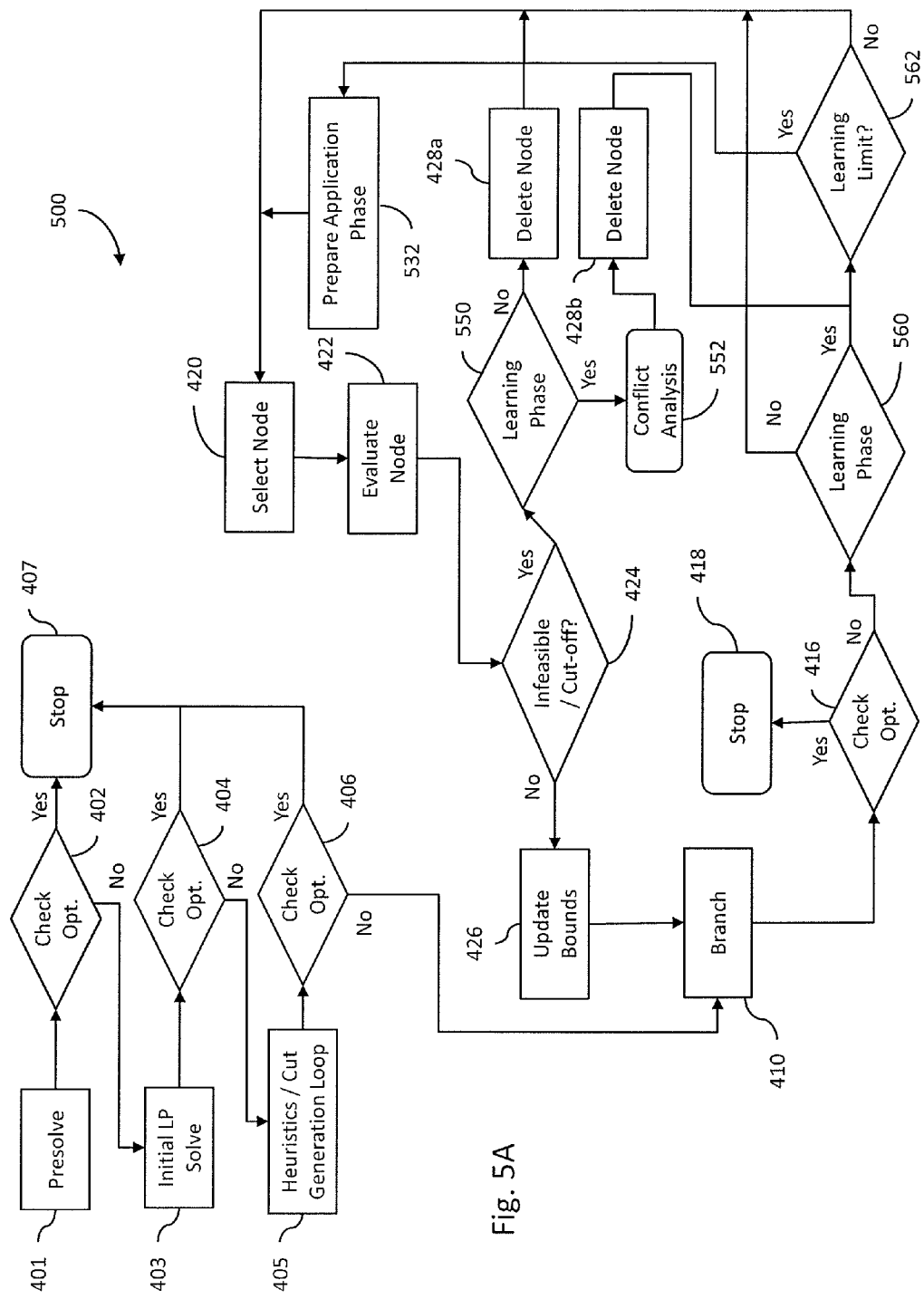

Referring now to FIGS. 4 and 5A, FIG. 4 shows a flowchart 400 of a traditional branch-and-cut process, while FIG. 5A shows a more detailed flowchart 500 of a two-phase branch-and-cut process according to one embodiment of the present disclosure. Because FIGS. 4 and 5A have a number of shared elements, description of these elements is applicable to each figure. Note, however, that FIG. 5A includes additional decision and processing blocks (e.g. 550, 552, 560, and 562). Note also that the flowchart of FIG. 5A corresponds to both the learning phase branch-and-cut process and the application phase branch-and-cut process. Depending on the phase, certain portions of the flowchart may or may not be used. Drawing conventions used in FIG. 5A are as follows: processing steps are shown in rectangles, decision blocks are represented by diamonds, and termination blocks are represented by rounded rectangles.

In FIG. 5A, preprocessing of the MILP begins in the learning phase branch-and-cut process at block 401 where presolve is performed on a MILP. Presolve may be performed according to any of a number of conventional "presolve" processes to attempt to reduce the set of potential solutions for a MILP, thereby reducing the complexity of the solution space to be searched. FIGS. 4 and 5A both indicate that it is possible to identify an optimal solution during presolve 401, and thus a check is made at block 402. If an optimal solution is found, the process stops at block 407. However, if an optimal solution is not found, the process moves to block 403 and attempts an initial LP solve of the MILP. As with presolve, this initial LP solve is a conventional technique that may be used to quickly identify an optimal solution to a MILP. A check is made at block 404 to determine if an optimal solution has been found. If one has been found, the process stops at block 407. Otherwise, the method proceeds to block 405.

In block 405, the method of FIG. 5A (and the corresponding block of FIG. 4) performs heuristics and generates cuts on the MILP. As with the presolve and initial LP solve steps, the heuristics and initial cut generation steps are conventional techniques that are directed to simplifying the MILP prior to performing a branch-and-cut process. As with presolve and the initial LP solve, it is possible to identify an optimal solution during block 405, thus a check is made at block 406. If an optimal solution is found, the process stops 407. Otherwise, the process proceeds to block 410 of one embodiment 500 of the learning phase branch-and-cut process 330.

As discussed above with respect to FIG. 3, in the learning phase process 330, nodes are identified and evaluated according to a traditional branch-and-cut process, which is reflected in the flowchart 500 of FIG. 5A. Because there are two phases shown in FIG. 5A, in this embodiment, it is necessary to keep track of which phase is being executed. Thus, in this embodiment, to set the phase of the process, the process may maintain a "phase" flag. For example, in this embodiment, the phase flag is set to '0' when the process is in the learning phase, and to '1' when the process is in the application phase. As discussed above, while FIG. 5A includes an example of a traditional branch and cut process, it also includes additional steps that are discussed below in more detail. The learning phase branch and cut process begins by setting the phase flag to '0' and branching 410 on the root node to additional nodes, which are added to a node queue for subsequent processing. At each branch, the learning phase process may also update bounds for the MILP or determine improved pseudo-costs. Pseudo-costs are conventional aspects of a MILP and may be calculated from the objective coefficients of the variables and may indicate the relative importance of a variable to the objective. The learning phase, in some embodiments, may provide improved pseudo-costs resulting from actual branches taken during the learning phase branch-and-cut process.

At each iteration, a check is made to determine whether an optimal solution has been found 416 for the MILP. If an optimal solution is found, the process stops 418. Otherwise, the process proceeds to block 560 where it checks to determine whether it is operating in the learning phase or the application phase. Note that block 560 does not exist in FIG. 4 as a part of a conventional branch-and-cut process. Rather, block 560 has been added to allow for a learning phase process. For purposes of this embodiment, the phase flag is set to '0,' indicating the process 500 is in the learning phase, and thus, block 560 evaluates to 'yes' and the process proceeds to block 562.

In block 562, a determination is made as to whether a learning phase limit has been reached. As with block 560, block 562 is not found in the conventional branch-and-cut process shown in FIG. 4 because the conventional branch-and-cut process does not include or use a learning phase. At block 562, the one or more thresholds established at block 320 of FIG. 3 are checked. As discussed above with respect to block 320, counters may be established to track certain events relevant to one or more thresholds, such as a number of nodes evaluated or a number of conflict clauses generated. For each established threshold, a check may be done to determine whether the threshold has been reached or exceeded. If one or more thresholds is reached, block 562 may evaluate to 'yes.' However, for purposes of this explanation, we will assume that no thresholds have yet been reached. Thus, block 562 evaluates to 'no' and the method proceeds to block 420.

In block 420, a node is selected from the node queue, the node is then evaluated in block 422, and the feasibility of the node is determined in block 424. In addition, in embodiments where a "number of nodes" threshold has been established, a counter corresponding to the number of nodes evaluated may be incremented at this time. If the selected node is feasible, bounds are updated in block 426, and the learning phase process returns to block 410 for another iteration.

However, if the node is infeasible at block 424, rather than simply cutting the node as would be done in block 428 of the conventional branch-and-cut method of FIG. 4, the process of FIG. 5A proceeds to block 550. In block 550, it is determined whether the branch-and-cut process is in the learning phase, such as by checking the phase flag. In this iteration, the process is still in the learning phase and so block 550 evaluates to 'yes.' Responsive to determining the learning phase process is executing, the method proceeds to block 552 to perform conflict analysis. In some embodiments, a learning phase process is separate from an application phase process and so a determination that the embodiment is within a learning phase process may not be needed. In one embodiment, conflict analysis 552 may be performed as follows.

Let '|' denote the logical or and '&' denote the logical and. Given binary variables $x_1, x_2, \ldots, x_n$, a literal $l \in L = \{x_1, \ldots, x_n, \bar{x}_1, \ldots, \bar{x}_n\}$ is defined to be either the variable $x_j$ or its negation $\bar{x}_j$ and a clause $C = \{l_1 | l_2 | \ldots | l_k\}$ is a disjunction of literals. A logic formula expressed as $C = \{C_1 \& C_2 \& \ldots \& C_m\}$ is said to be in conjunctive normal form. The problem of Boolean satisfiability (known as "SAT") involves finding an assignment $x \in \{0,1\}^n$ such that the formula C is satisfied (each clause $C_i$ evaluates to 1) or to show that for all $x \in \{0,1\}^n$ at least one $C_i$ evaluates to 0.

Some SAT solution methodologies involve branching and applying Boolean constraint propagation. This can be equivalent to branching and node presolve in MILP, for example. If a clause becomes empty, i.e., if it is evaluated as false, during the Boolean constraint propagation then conflict analysis is applied to derive conflict clauses that are responsible for the infeasibility. In order to derive the conflict clauses, a conflict graph is constructed. The vertices of this graph include the current variable bound changes. The directed arcs connect the nodes, the bound change at the tail of the arc causes the bound change at the head of the arc, and each arc denotes this deduction.

An additional node is created to represent the conflict and all nodes representing variable assignments in the empty clause are connected to this conflict node. In this conflict graph, any cut that separates the branching nodes from the conflict node gives a conflict clause. All clauses that result from infeasible nodes detected by both presolve and LP solve are collected. In the case of infeasibilities arising from the solution of a LP, the system may not be able to determine exactly which of the bound changes cause the infeasibility, e.g., the system has not determined arcs connecting the nodes of the conflict graph to the conflict node. In order to determine the bound changes that caused the infeasibility, the system performs infeasibility analysis to determine irreducible inconsistent subsystem (IIS). Once the system has determined the bound changes that cause the infeasibility in LP, the system connects these bound changes with the conflict node and finds the resulting conflict clauses.

A conflict analysis may collect conflict information about the MILP. For example, conflict analysis may generate one or more conflict clauses describing a basis for the conflict. In embodiments where a "number of conflict clause" thresholds has been established, a counter corresponding to the number of conflict clauses generated is incremented by the number of conflict clauses generated. After the conflict analysis has completed, one or more cuts may be generated if the resulting conflict clauses can be linearized, i.e., if the clauses contain only binary (i.e. 0-1) variables, the node is then cut off and the process returns to block 420, where the next node is selected for evaluation.

After performing the conflict analysis in block 552, the method proceeds to block 428b, where the node is cut, and prior to returning to block 420 in FIG. 5A, the learning phase process proceeds to block 562 to determine whether any thresholds have been reached. If no thresholds have been met, the process 500 returns to block 420 and continues to perform the learning phase process. However, if a threshold is reached, block 562 evaluates to 'yes' and the process 500 proceeds to block 532. For example, in one embodiment, if any threshold has been reached, the process 500 proceeds to block 532. In some embodiments, multiple thresholds must be met. For example, in one embodiment, thresholds may be established for a number of nodes evaluated and a number of conflict clauses generated. However, in one such embodiment, the learning phase process will continue until both of these thresholds are satisfied. Some embodiments may employ more or different thresholds or require satisfaction of one or more thresholds prior to completing the learning phase process.

In block 532, the process 500 is prepared to execute the application phase branch-and-cut process. In this embodiment, the phase flag is changed from '0' to '1' to indicate that the process 500 has switched to the application phase. As discussed above with respect to FIG. 3, in this embodiment all nodes are pruned to allow the application phase branch-and-cut process to restart processing on the MILP. The root node of the MILP is then restored and the collected search information is used, for example, to update the global bounds of the MILP using the information obtained from the learning phase process, and to apply cuts to the root node that were generated at leaf nodes during the learning phase process. In some embodiments, additional information may be used, such as improved pseudo-cost information obtained during the learning phase process that can be re-used during the application phase branch-and-cut process. After the application phase process has been prepared, the process 500 returns to block 420.

As with the learning phase process, the application phase process selects a node to evaluate at block 420, and then evaluates the node in block 422. In block 424, the application phase branch-and-cut process determines whether the node represents a feasible solution and, if not, proceeds to block 426 where the process 500 updates the bounds of the MILP to reflect the feasibility of the current node and proceeds to block 410. Updating the bounds is a conventional technique of a branch-and-cut process for refining the MILP during the iterative branch-and-cut process. Next, as discussed above, the process 500 branches on the node at block 410, and the nodes that are on the branches are added to the node queue for later evaluation. A check is then performed at block 416 to determine if an optimal solution has been found. If so, the process 500 stops 418. Otherwise, the process 500 proceeds to block 560. During this iteration, block 560 evaluates to "no" because the phase flag has been set to '1,' indicating that the process 500 is executing the application phase. Thus, the process 500 returns to block 420 for another iteration.

In the next iteration, a node is selected 420 from the queue and evaluated in block 420. If at block 424 the node is determined to be infeasible, the application phase process branches to block 550. In block 550, the phase flag is evaluated and now is set to '1.' Thus the process 500 determines that it is not in the learning phase and proceeds directly to block 428a without performing conflict analysis at block 552. The process 500 deletes the node at block 428a and then returns to block 420 for another iteration.

Thus, during the application phase branch-and-cut process, no thresholds are applied and no conflict analysis is performed. So during the application phase, the process 500 performs a traditional branch-and-cut process, such as is shown in FIG. 4, with the addition of two decision blocks (550 and 560) to determine whether the process 500 is executing in the learning phase or the application phase. In some embodiments, these decision blocks may be eliminated by executing an unmodified traditional branch-and-cut process. By performing the initial learning phase process to generate conflict information and applying that conflict information to the MILP, the application phase process may be able to identify an optimal solution to the MILP more quickly than by simply executing a traditional branch-and-cut process 400 on the original MILP.

Figure 5B:
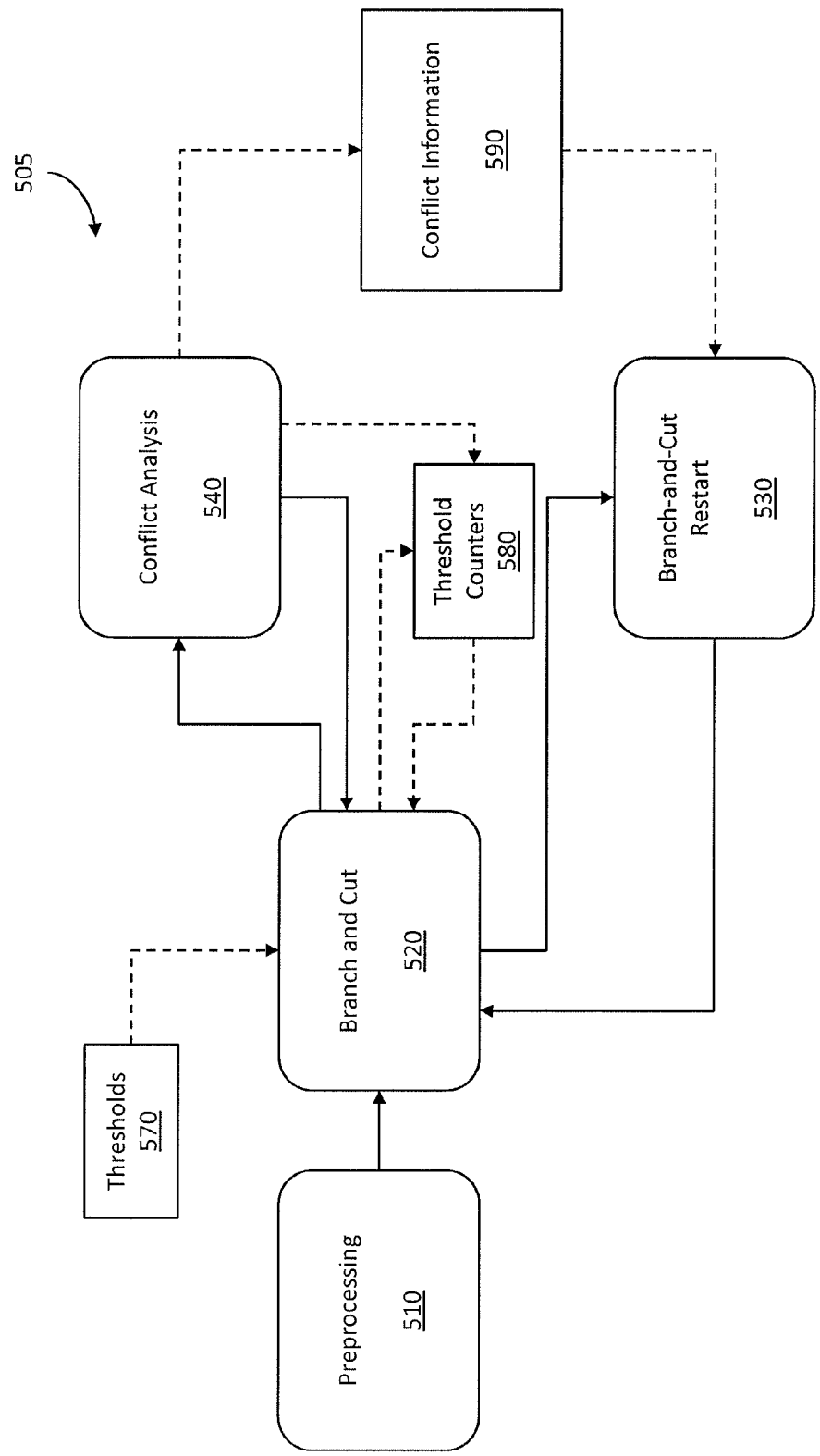
FIGS. 5B-C show examples of software modules for conflict resolution in a mixed integer program solver according to embodiments of this disclosure.
Figure 5C:
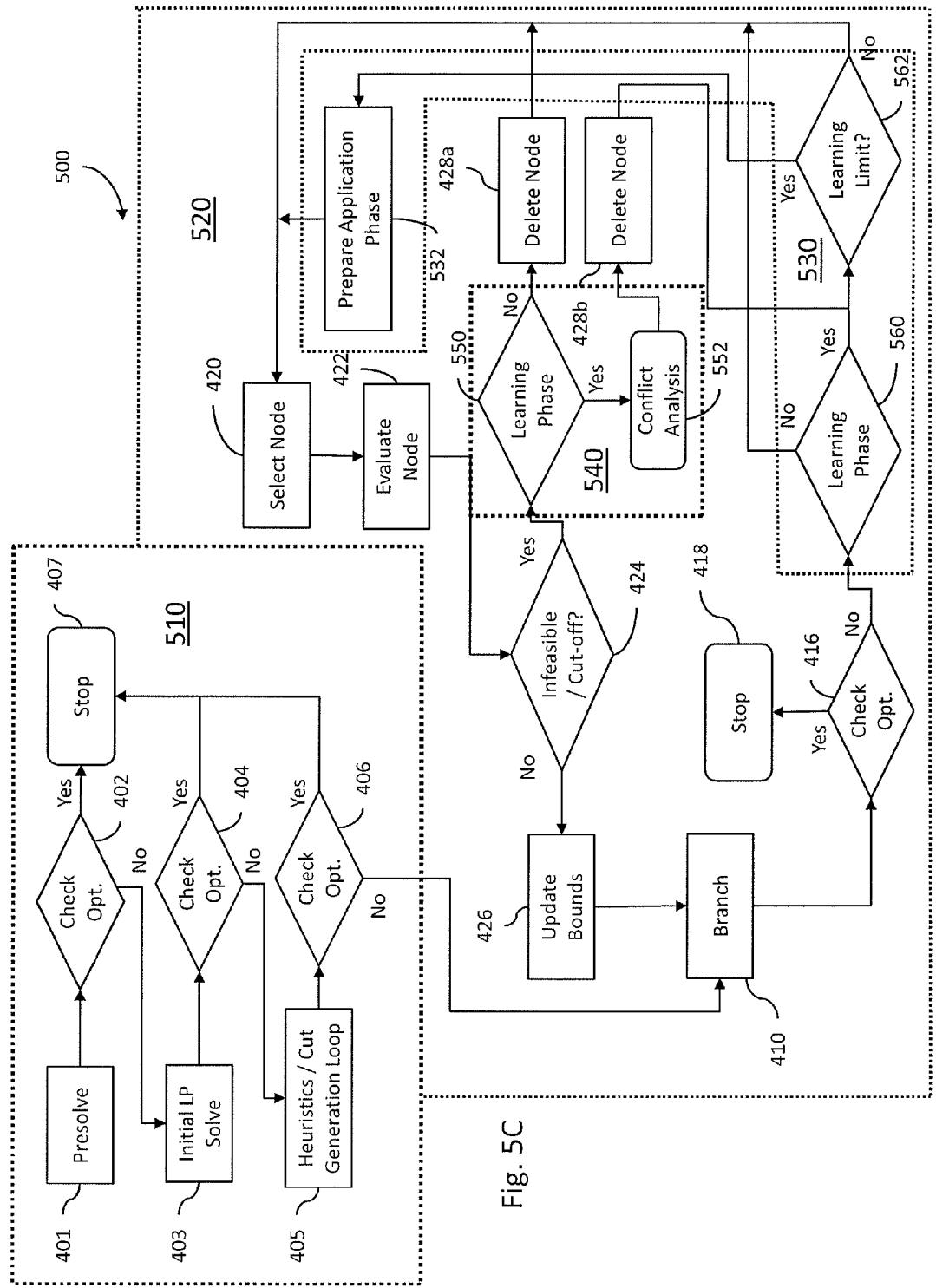

Referring now to FIG. 5B, FIG. 5B shows a software system 505 that has a plurality of modules 510, 520, 530, and 540 configured to perform the method shown in FIGS. 3 and 5A. FIG. 5C shows the method of FIG. 5A as implemented by the software modules described with respect to FIG. 5B. In the embodiment shown in FIG. 5B, functionality has been divided into different modules for execution. Drawing conventions used in FIG. 5B are as follows. Blocks with rounded corners represent software modules, such as software modules 510-540. Blocks with sharp corners represent data stored in memory. Solid arrows represent execution flows. Dashed arrows represent data flows.

Preprocessing module 510 includes program code for preprocessing the MILP, such as described above with respect to block 325 of FIG. 3, which may include blocks 401-406 shown in FIG. 5C. In the embodiment shown in FIG. 5B, the preprocessor module 510 includes program code for performing presolve 401 on a MILP, for performing an initial LP solve 403 on the MILP, and a loop for performing heuristics and generating cuts on the MILP 405.

In addition, the preprocessor module 510 includes program code for checking the optimality of potential solutions of the MILP 402, 404, 406.

As may be seen in FIGS. 5B-C, following execution of the preprocessing module 510, execution flows to the branch-and-cut module 520. In some embodiments, the preprocessing module 510 may also set a phase flag to indicate whether the branch-and-cut module should execute in a learning phase or an application phase. While not shown in FIG. 5B, in some embodiments, the preprocessing module may establish and store one or more thresholds in block 570. In some embodiments, such as the one shown in FIG. 5B, thresholds in block 570 may be established by reading threshold values from a configuration file or may be statically configured.

Branch-and-cut module 520 includes program code for receiving a MILP, such as from the preprocessor module 510, and for performing a branch-and-cut process on the received MILP. As may be seen in FIG. 5B, the branch-and-cut module 520 is configured to communicate with conflict analysis software module 540 and branch-and-cut restart software module 530. As described above with respect to block 330 in FIG. 3 and as shown in FIG. 5C, a learning phase process employs a branch-and-cut process. Branch-and-cut module 520 also includes program code for receiving thresholds in block 570, updating threshold counters 580, and reading threshold counters 580 to test against the established thresholds in block 570.

As is shown in more detail in FIG. 5C, the branch-and-cut module 520 includes program code for performing a branch-and-cut process and program code for executing the conflict analysis module 540 to perform conflict analysis on an infeasible node. The branch-and-cut module 520 includes program code for, upon determining that a node is infeasible and determining that the branch-and-cut module is in the learning phase, executing the conflict analysis module 540. In addition, the branch-and-cut module 520 includes program code for determining when one or more thresholds have been reached and for executing the branch-and-cut restart module 530 upon determining that the appropriate threshold or thresholds have been reached.

In the embodiment shown, conflict analysis module 540 includes program code for receiving MILP information from the branch-and-cut module 520, and program code for performing conflict analysis as described in more detail above with respect to block 552 shown in FIG. 5A. In some embodiments and as discussed above with respect to block 330 of FIG. 3, the conflict analysis module 540 includes program code for performing an infeasibility analysis, deriving one or more conflict clauses, and storing the one or more conflict clauses for use by software module 530 to prepare the application phase branch-and-cut process. For example, as may be seen in FIG. 5B, the conflict analysis module 540 is configured to store conflict clause information in the conflict information block 590 and to update threshold counters, such as a number of conflict clauses generated, if applicable in a particular embodiment.

In the embodiment shown in FIGS. 5B and 5C, the branch-and-cut restart software module 530 includes program code for preparing a subset of nodes for the application phase branch-and-cut process as described above with respect to block 340 of FIG. 3 and block 532 in FIGS. 5A and 5C. Software module 530 includes program code for receiving, or for otherwise accessing, the conflict clauses stored by the conflict analysis software module 540 in the conflict information block 590. In addition, the branch-and-cut restart software module 530 includes program code for pruning all nodes and restoring the root node. Software module 530 also includes program code for updating global bounds of the MILP based on the information obtained from the learning phase process, and program code for applying cuts generated at leaf nodes during the learning phase process to the root node. In this embodiment, software module 530 also includes program code for performing presolve, an initial LP solve, and performing heuristics and generating cuts, such as to eliminate redundant constraints, for the application phase process. Alternatively, in some embodiments, the branch-and-cut restart software module 530 may transfer execution to the preprocessing module 510.

The branch-and-cut restart software module 530 is configured to restart the branch-and-cut software module 520 after preparing the subset of nodes for the application phase branch-and-cut process. To restart the branch-and-cut software module 520, the branch-and-cut restart software module 530 includes program code to provide the updated global bounds and the subset of nodes to the branch-and-cut software module, and to then restart the branch-and-cut software module 520 on the MILP using the updated information.

The embodiment shown in FIGS. 5B-C may provide a suitable modular architecture for conflict resolution in a mixed integer program solver according to embodiments of this disclosure. Software embodiments according to the embodiment shown in FIGS. 5B-C may be encoded on a non-transitory computer-readable medium, including instructions configured to cause a data processing apparatus to perform the methods discussed above with respect to FIGS. 3 and 5A. Embodiments of example data processing apparatuses are discussed in more detail below with respect to exemplary hardware systems.

Illustrative Method for Stabilizing Cut Generation in a MILP Solver

In one illustrative embodiment, a method for stabilizing cut generation in a MILP solver is configured to receive a MILP having one or more objectives. For example, a gas company needs to develop a plan for using its pipeline network to supply demand for gas based on the various suppliers of gas to its pipeline. The pipeline includes lengths of piping connected by valves and compressors to pressurize the gas to be pumped through the pipeline. The pipeline needs to properly configure or adjust each of these valves and compressors during operation to meet demand, but also to minimize its costs to provide gas to its consumers. Because each valve and compressor has a variety of different settings, the gas company can formulate a MILP model for the problem. In this particular embodiment, the MILP is susceptible to large-scale numerical complexity that can be aggravated by traditional branch-and-cut MILP solvers. However, the size of MILP can be reduced through application of this illustrative embodiment, as well as other embodiments, according to this disclosure.

After receiving the gas pipeline MILP, the MILP is analyzed to determine an initial LP solution, which includes a determination regarding whether the LP solution is non-optimal. If the LP solution is non-optimal, nodes are evaluated and cuts may be generated over multiple iterations to remove infeasible nodes. However, the iterative application of cuts may result in instability in the solution process due to an increasingly-smooth surface of the polyhedral feasible region.

More specifically, cuts are represented as cutting planes, which are valid linear inequalities that are added to the original MILP for strengthening its formulation. The procedure of using cuts in a MILP solver involves generating the cuts that violate the current non-integral LP relaxation solution, and then adding some or all of them to the problem formulation. Solvers add cuts to the problem in what is referred to as Kelley's scheme. In this scheme, cuts having the highest score are selected and added to the problem in each round or iteration of cut generation.

To be more specific, the process involves solving the LP relaxation, generating cuts that cut-off the fractional LP solution, adding the cuts to the problem formulation and then solving the LP relaxation again. This process is iterated for a number of iterations after which a branch-and-bound algorithm is initiated. Kelley's scheme of cut addition works until a certain number of iterations of cut generation have occurred, after which cuts tend to become weak as the LP solutions they separate become closer and closer and approximate a smooth surface. This may result in an unstable LP tableau and makes it difficult to get stronger cuts. There are various approaches that have been proposed as alternatives to Kelley's scheme of cut addition; these include incorporating a Lagrangian scheme, dive and cut, local cuts, etc. These methods are alternative ways to generate and add cuts, and none of these approaches present a methodology to eliminate the problems inherent in Kelley's scheme when following that approach.

To address this issue, this illustrative embodiment generates a sub-MILP of the MILP and determines one or more new objectives of the sub-MILP. The newly generated objectives are different from the objectives of the original MILP and are selected such that the new objectives may generate an LP solution that is substantially different from solutions to the original MILP. For example, in some embodiments, the new solution has different fractionalities than the original MILP. In some embodiments, the new solution is spatially located at a different point than the original LP solution. Such new LP solutions may ensure that the same cuts are not generated for the sub-MILP as were generated for the original MILP. These newly-generated objectives are then employed to generate one or more cuts, including one or more cuts that desirably cut off prior LP solutions, or a substantial portion of the smooth surface described above, from the original MILP. These cuts are then applied to the original MILP and used to identify a new LP solution and new bounds associated with the original MILP. These new bounds and the new LP solution can then be stored and used to solve the original MILP.

Figure 6:
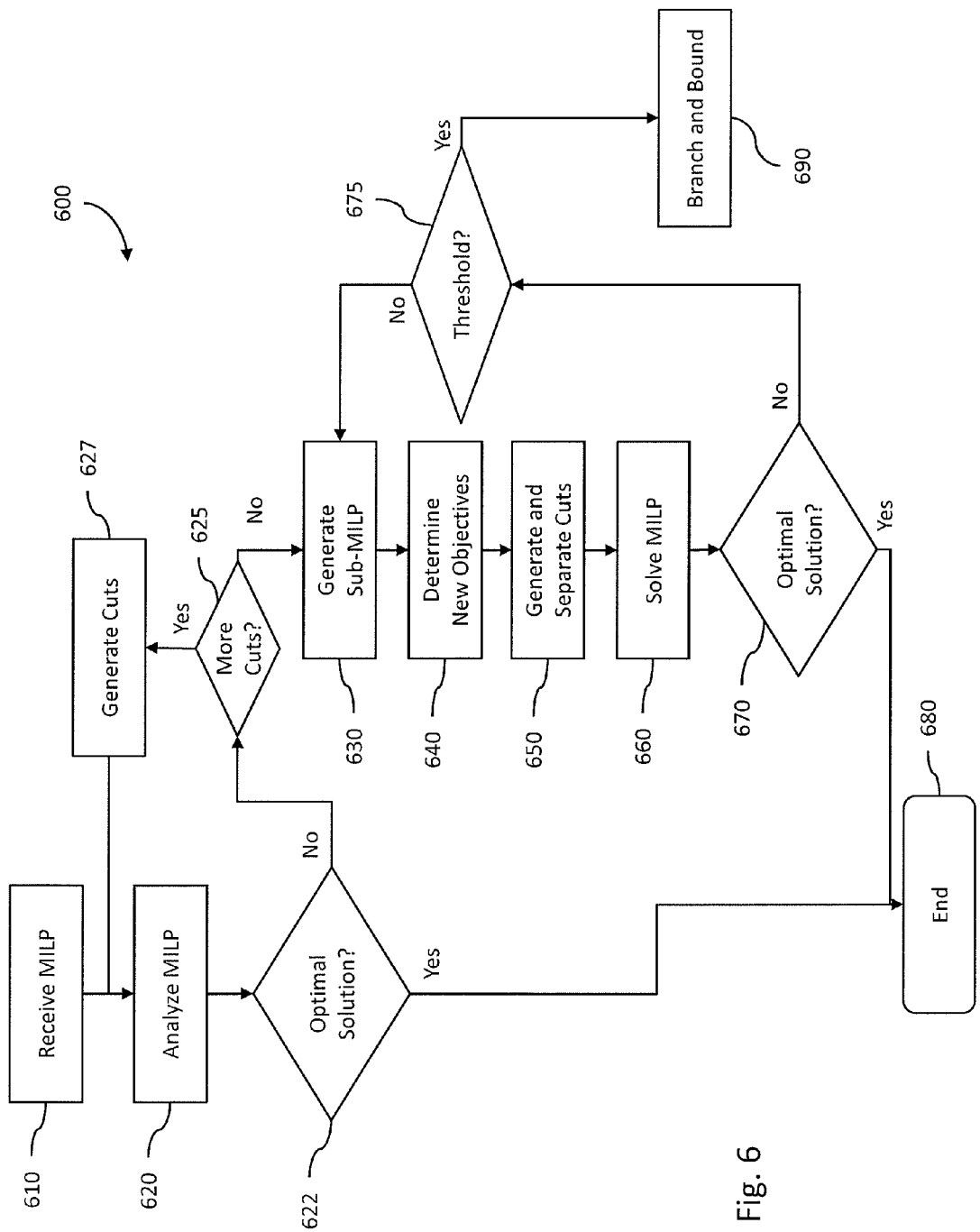
FIG. 6 shows an example of a method for stabilizing cut generation in a mixed integer program solver according to embodiments of this disclosure.

FIG. 6 shows a method 600 for stabilizing cut generation in a MILP solver. The method 600 shown in FIG. 6 may be performed by one or more of the systems shown in FIGS. 1A-C or 2, or by other systems according to the scope of this disclosure.

The method 600 shown in FIG. 6 begins in block 610 by receiving a MILP. For example, a MILP may be provided on a computer-readable medium connected to or inserted into a computer system. In some embodiments, a MILP may be received from a remote computer over a communications link, or may be received from one or more users working at terminals. After the MILP has been received, the method 600 proceeds to block 620.

In block 620, the MILP is analyzed over a number of iterations to generate cuts and to determine initial LP solutions. In block 622, the initial LP solution is evaluated to determine if it is optimal. If the solution is optimal, the method terminates in block 680; however, if the LP solution is not optimal, the method proceeds to block 625 and determines whether further cuts should be generated. To determine whether further cuts should be generated, the method may maintain one or more thresholds. For example, a threshold may be maintained to establish a maximum number of iterations or a maximum number of generated cuts. After each iteration of block 620, a counter value may be incremented and compared against the threshold at block 625. If block 625 evaluates to 'yes,' the method proceeds to block 627 to generate further cuts to the MILP and returns to block 620. Alternatively, if block 625 evaluates to 'no,' the method proceeds to block 630.

In block 630, a sub-MILP for the MILP is generated. Various techniques may be used to generate the sub-MILP. For example, some embodiments may only use constraints of the MILP that are active to generate the sub-MILP. Further, some embodiments may change objective coefficients to emphasize certain variables. After generating the sub-MILP, the method proceeds to block 640.

In block 640, new objectives are determined for the sub-MILP. In this embodiment, each of the new objectives for the sub-MILP are different from the objectives of the original MILP. For example, in one embodiment, an objective of the sub-MILP is modified such that it should result in an LP solution that is different from the original solution, but when generating cuts for the new LP solution it should also be able to cut off the previous LP solution. Some embodiments may change objective coefficients to emphasize certain variables. Some embodiments may select an objective with an all-zero objective.

In some embodiments, one or more variables are selected to be incorporated into the objective function based on pseudo-costs for the one or more variables. As described above, pseudo-costs may be calculated from the objective coefficients of the variables and may indicate the relative importance of a variable to the objective. Coefficients for one or more selected variables may be increased (if the objective function is to be maximized) or decreased (if the objective function is to be minimized). In some embodiments, however, new objectives may be selected randomly, or an all-zero objective may be selected. When selecting new objectives in one embodiment, new objectives are selected such that at least one of the new objectives is different from an original objective, and the different objective may, over multiple iterations, be modified to move closer to an original objective. In one embodiment, one or more new objectives are selected to provide a new LP solution that is different from the initial LP solution of the original MILP. For example, in some embodiments, the objectives may be selected to obtain a new LP solution that has different fractionalities. In some embodiments, the objectives may be selected to obtain a new LP solution that includes a spatially different location. After selecting one or more new objectives for the sub-MILP, the method proceeds to block 650.

In block 650, one or more cuts are generated for the sub-MILP. Cuts may be generated for the sub-MILP according to one or more techniques, including mixed integer rounding (MIR), Knapsack Covers, Gomory Mixed-Integer Cuts (GMIC), Flow Covers, generalized upper bounds, Zero-Half, or others. In one embodiment, one or more cuts are generated that cut off the initial LP solution. In addition, the generated cuts are separated in preparation for providing the separated cuts to assist with solving the original MILP. In some embodiments, improved bounds may be determined when determining one or more cuts based on the sub-MILP. In embodiments where improved bounds are determined, the improved bounds are stored for subsequent use with the original MILP. After the one or more cuts are generated and separated for the sub-MILP, the method proceeds to block 660.

In block 660, the one or more cuts for the sub-MILP are incorporated into the original MILP. In embodiments where improved bounds have been determined, the improved bounds are also incorporated in to the original MILP. A new LP solution to the original MILP is then determined based on the one or more cuts, and if provided, the improved bounds. If the new LP solution for the original MILP is optimal, as determined in block 670, the solution is output. However, if the new LP solution is not optimal, the method returns proceeds to block 675 where a threshold is checked. For example, if an iteration threshold has been set, the number of iterations is compared against the threshold to determine if the threshold has been met. If the threshold has been met, the method proceeds to a different MILP solver, such as a branch-and-bound solver 690. However, if the threshold has not been met, the process returns to block 630 for an additional iteration. In some embodiments, the number of iterations to be attempted is limited. For example, in one embodiment, an iteration threshold may be set to a predetermined value. After each iteration, an iteration counter is incremented and compared against the iteration threshold. When the iteration counter equals or exceeds the iteration threshold, the MILP is provided to a different MILP solver, such as a branch-and-bound MILP solver.

Figure 7A:
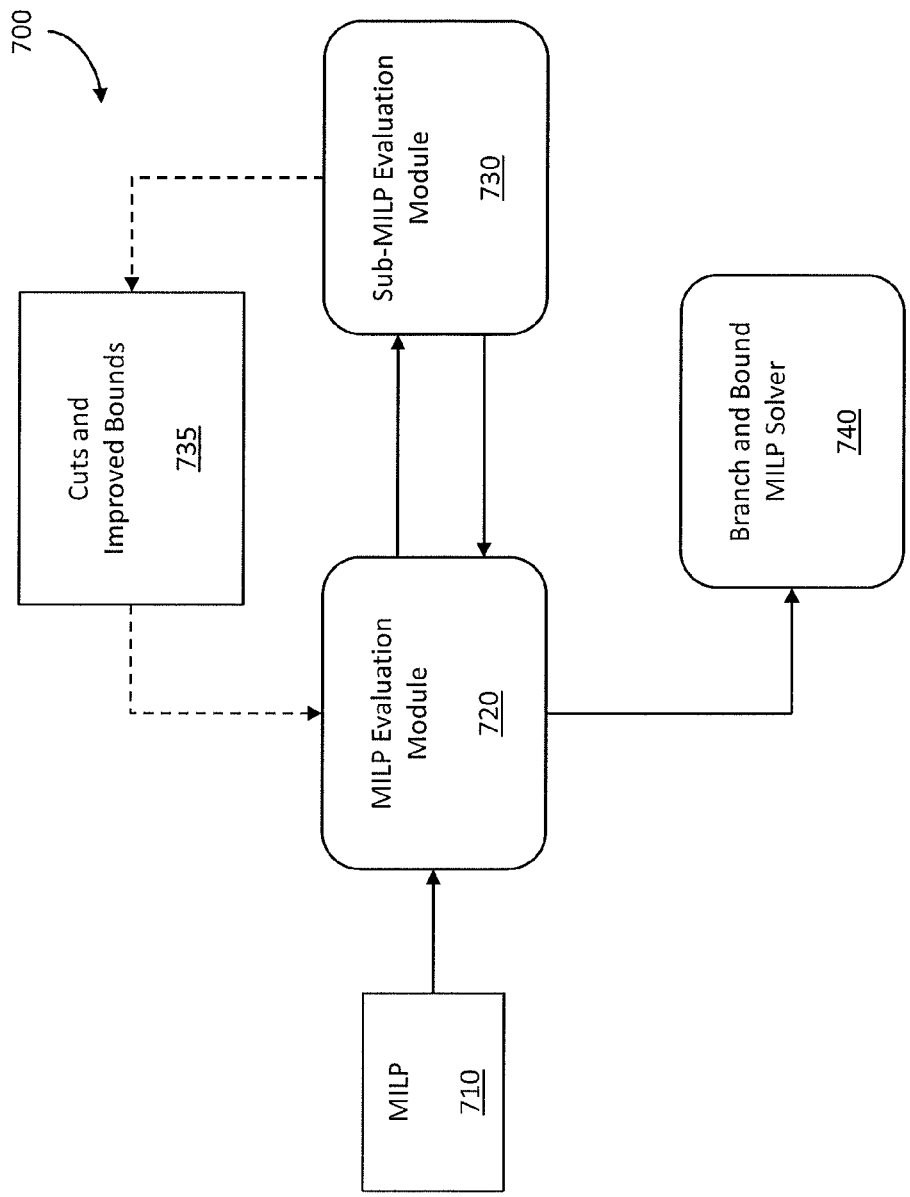
FIGS. 7A-B show an example of software modules for stabilizing cut generation in a mixed integer program solver according to embodiments of this disclosure.
Figure 7B:
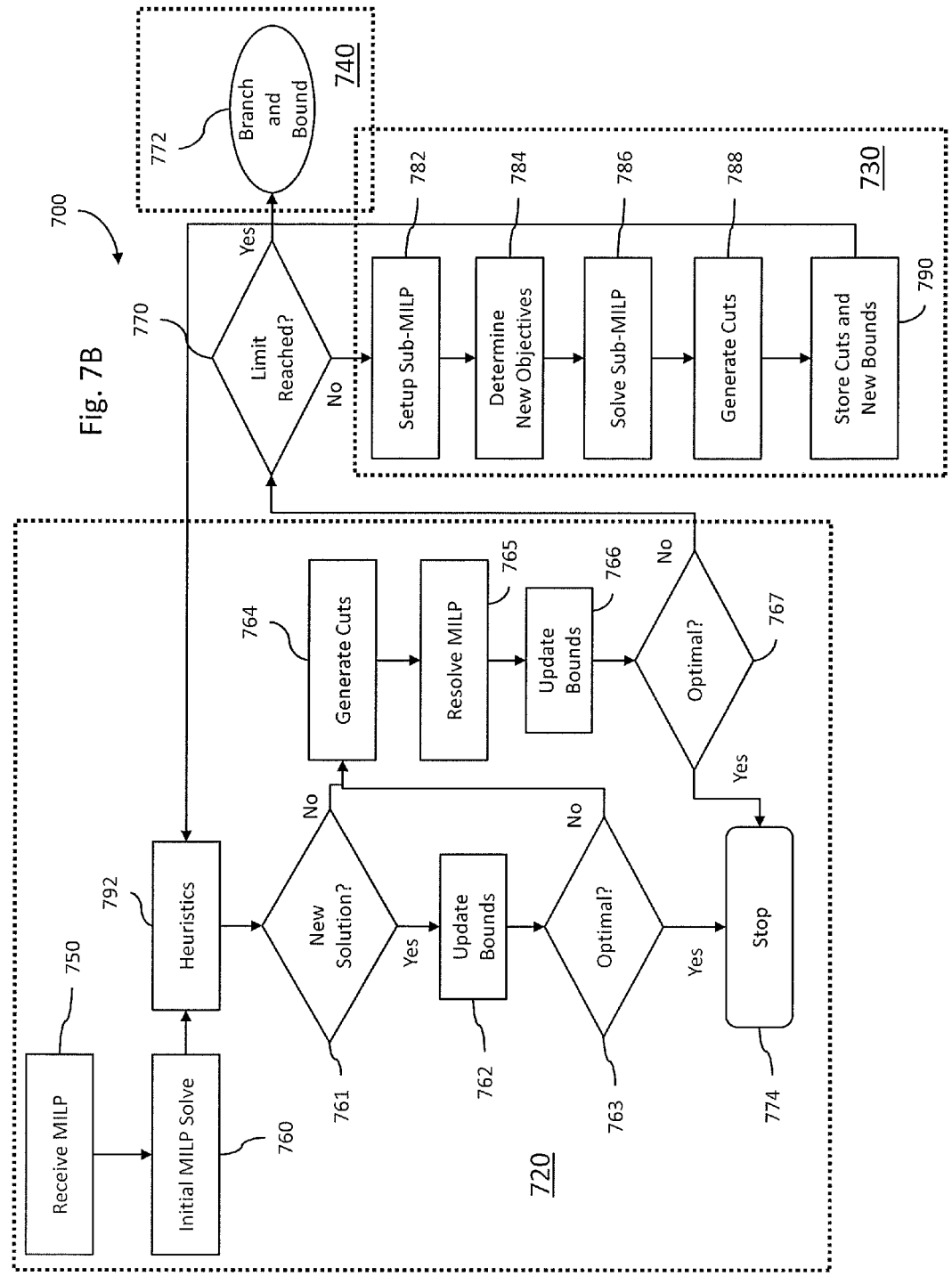

Referring now to FIGS. 7A-B, FIG. 7A shows software modules having program code for stabilizing cut generation in a mixed integer program solver according to embodiments of this disclosure. FIG. 7B also shows the software modules of FIG. 7A, but shows processing steps performed by the software modules.

In the embodiment shown in FIGS. 7A-B, a system 700 is shown having three software modules 720, 730, 740 configured to provide stabilizing cut generation in a MILP solver. In the embodiment shown, the system includes a MILP evaluation module 720, a sub-MILP evaluation module 730, and a branch-and-bound MILP solver 740.

As may be seen in FIG. 7A, the MILP evaluation module 720 is configured to receive a MILP 710, and to evaluate the MILP 710 and generate cuts for the MILP 710. After iteratively generating one or more cuts for the MILP 710 and failing to determine an optimal LP solution, the MILP evaluation module 720 is configured to execute the sub-MILP evaluation module 730, or if a threshold number of iterations has been reached, the MILP evaluation module 720 is configured to execute the branch-and-bound module 740 to attempt to solve the MILP 710.

Referring to FIG. 7B, the MILP evaluation module 720 includes program code for receiving a MILP 750 to be solved and iteratively determining LP solutions and generating cuts for the MILP. The MILP evaluation module 720 includes program code for performing an initial LP solve on the MILP 760 to determine an initial LP solution for the MILP. The MILP evaluation module 720 also includes program code for performing heuristics 792 based on the initial LP solution, and determining whether the current LP solution is a new solution 761. If the solution is a new solution, the MILP evaluation module includes program code for updating bounds 762 based on the new LP solution. After updating the bounds, the MILP evaluation module 720 determines whether the new LP solution is optimal at block 763. If the new LP solution is optimal, the MILP evaluation module 720 returns the LP solution and terminates at block 774. Otherwise, if the new LP solution is not optimal, the MILP evaluation module 720 proceeds to block 764. If the LP solution is not a new solution, the MILP evaluation module 720 proceeds to block 764, described below. As may be seen in FIG. 7A, the MILP evaluation module is configured to receive cuts and improved bounds 735 that have been stored by the sub-MILP evaluation module 730. Such cuts and improved bounds may be incorporated by the MILP evaluation module 720 in block 762.

The MILP evaluation module 720 also includes program code to generate cuts 764 based on the current LP solution and to attempt to resolve the MILP 765. In the embodiment shown in FIG. 7B, the MILP evaluation module 720 is configured to only iteratively generate cuts for the MILP once per MILP evaluation, though in some embodiments, a plurality of iterations may be employed. The MILP evaluation module 720 includes program code for evaluating whether a threshold number of iterations has been reached at block 770. If the threshold has been reached, block 770 evaluates to 'yes,' and the MILP evaluation module passes control to the branch-and-bound process 772 for execution. If the threshold has not been reached, block 770 evaluates to 'no,' and the MILP evaluation module passes control to the sub-MILP module 730 for execution.

The sub-MILP evaluation module 730 includes program code for setting up a sub-MILP for the MILP 782, including determining new objectives for the sub-MILP 784. The new objectives for the sub-MILP are such that they should result in an LP solution that is different from the original solution, and when generating cuts for the new LP solution it should also be able to cut off the original LP solution. For example, in one embodiment, new objectives may be selected by selecting objectives that are different from the current objective, such as by setting variable coefficients to maximum or minimum values, or by excluding one or more constraints of the MILP. The new objectives may subsequently be iteratively revised to move towards the original objectives. For example in one embodiment, after establishing new objectives, a further set of new objectives may be generated by iteratively revising the new objectives towards the original objectives by a fixed increment or fixed percentage. In one embodiment, an all-zero objective may be selected as a new objective. In some embodiments, new objectives may be selected randomly.

In some embodiments, new objectives may be determined by identifying high-impact variables or by eliminating constraints. A high-impact variable may be one in which, for example, by fixing the variable, the sub-MILP may be more quickly solved. In some embodiments, a high-impact variable may be a variable that leads to a faster solution of the sub-MILP when bounds associated with the variable are improved. It may be possible to determine a high-impact variable based on information collected while processing a MILP, such as based on pseudo-costs.

In some embodiments, constraints may be eliminated that are apparently unimportant or less important to solving the MILP. For example, in one embodiment, one or more constraints are eliminated based on determining the distance of the constraint from an LP solution. For example, in one embodiment, a distance threshold may be established. In one such embodiment, constraints more distant from an LP solution than the established threshold may be eliminated.

The sub-MILP evaluation module 730 also includes program code to generate and separate 788 cuts for the sub-MILP, including generating new bounds for the sub-MILP that may be applied to the MILP. In one embodiment, it is desirable that the generated cuts cut off the original LP solution. Further, these cuts may be generated according to any method of generating cuts, including those discussed above with respect to block 650 of FIG. 6. The sub-MILP evaluation module 730 includes program code to store these new cuts and any new bounds 790. These cuts and new bounds are stored at block 735, as may be seen in FIG. 7A, which may then be accessed and used by the MILP evaluation module 720. The sub-MILP evaluation module 730 is then configured to return execution to the MILP evaluation module 720 to attempt to re-solve the MILP using the cuts and new bounds determined from the sub-MILP.

The branch-and-bound module 740 includes program code for performing a branch-and-bound process on the MILP after a threshold number of iterations has been reached. The branch-and-bound module 740 may employ any branch-and-bound process to attempt to solve the MILP, and in some embodiments, may employ embodiments as discussed above with respect to systems and methods for conflict resolution in a MILP solver.

Figure 8:
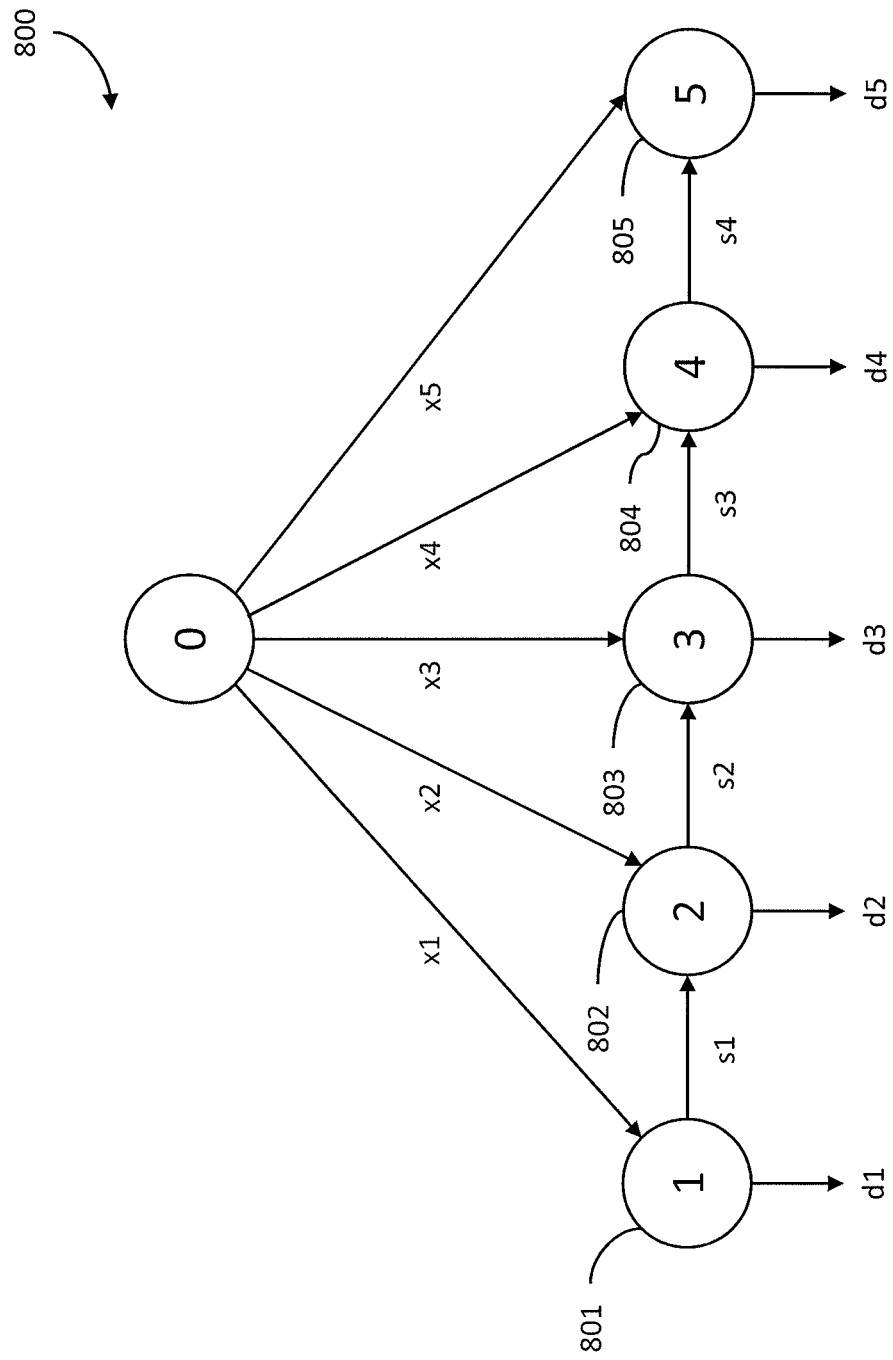
FIG. 8 shows an example of a model of a MILP suitable for use with one or more embodiments according to this disclosure.

FIG. 8 shows a model 800 that may be represented as a MILP for solving using one or more embodiments according to this disclosure. The model 800 represents a manufacturer's production parameters for production of a product during five different periods (801-805) throughout an upcoming year. The model includes variables representing the demands (d1-d5) for the product, the amount of product to produce in each of the 5 periods (x1-x5), and the remaining inventory at the end of periods 1-4 (s1-s4). In this example, the model 800 is represented by a root node and one or more global bounds or objectives. The root node and the global bounds are provided to a MILP solver according to this disclosure, which may then solve the MILP to allow the manufacturer to plan its production lines.

For example, in this illustrative embodiment, a MILP solver according to the method shown in FIG. 5A receives the MILP, including the root node and the one or more global bounds. The MILP solver then establishes a first threshold for a learning phase branch-and-cut process, and executes the learning phase branch-and-cut process by evaluating nodes associated with the MILP, collecting conflict information about the MILP, and determining whether the first threshold has been reached. In response to reaching the first threshold, the MILP removes all of the nodes of the MILP and restores the root node. The MILP solver then performs an application phase branch-and-cut process to solve the MILP using the restored root node and the collected conflict information.

In another illustrative embodiment, such as according to an embodiment shown in FIG. 7B, the MILP is provided to the MILP solver, which recites the MILP and objectives. The MILP solver then analyzes the MILP to determine an initial linear problem (LP) solution, including determining whether the initial LP solution is non-optimal as described above with respect to FIG. 7B. If the MILP solver determines that the initial LP solution is non-optimal, the MILP solver then generates a sub-MILP of the MILP and determines one or more objectives of the sub-MILP, such that the determined objectives of the sub-MILP are different from the one or more objectives of the MILP.

After the MILP solver generates the sub-MILP and its objectives, the MILP solver generates cuts based on the sub-MILP's objectives and analyzes the sub-MILP based on the cuts to determine a new LP solution and new bounds. The MILP solver then determines the new LP solution and the new bounds. Subsequently, the MILP solver solves the original MILP based on the cuts and the new bounds to provide a solution to the manufacturer to plan its production lines.

Figure 9:
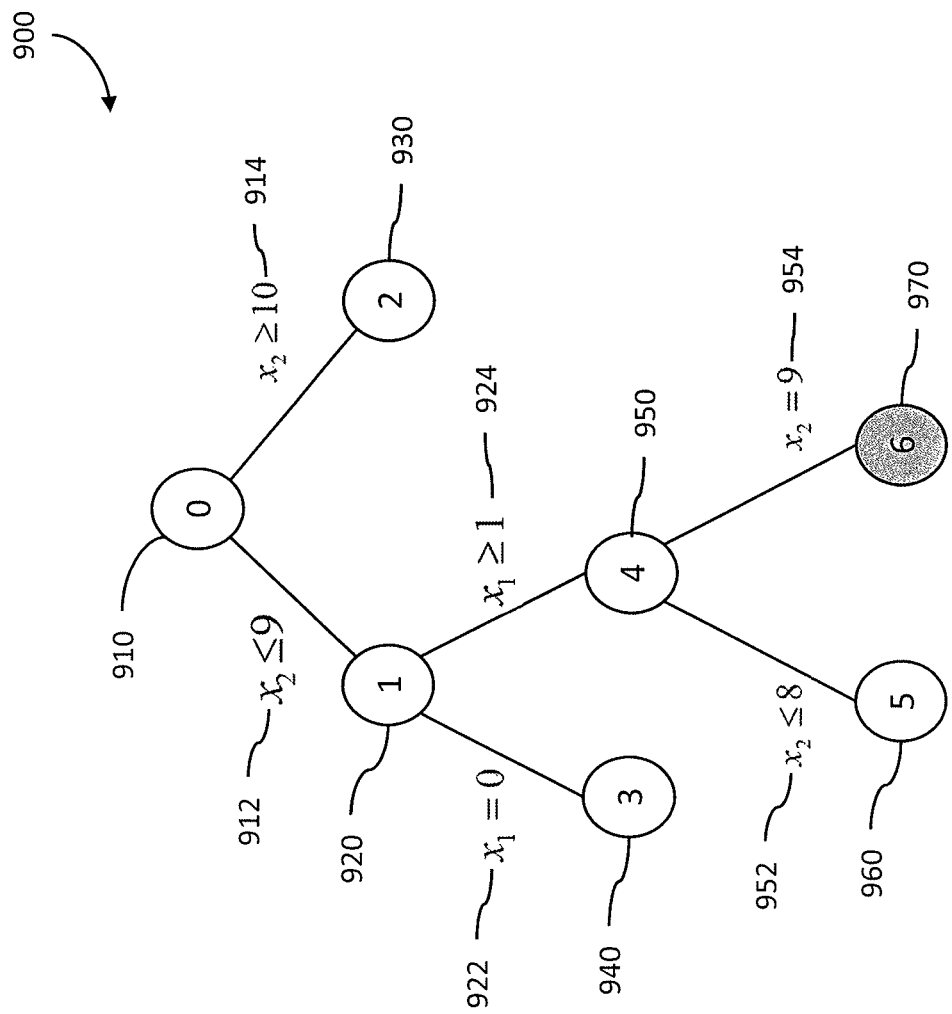
FIG. 9. Shows an example of a branch-and-bound tree suitable for use with one or more embodiments according to this disclosure.

FIG. 9 shows an example of a branch-and-bound tree suitable for use with one or more embodiments according to this disclosure. The tree shown in FIG. 9 is of a type that may be created during the course of attempting to solve a MILP. In the embodiment shown in FIG. 9, the tree comprises seven nodes, a root node 910 (labeled '0') and six child nodes 920-970 (labeled 1-6), and several branches 912, 914, 922, 924, 952, 954. While the tree 900 shown in FIG. 9 includes only seven nodes 910-970 based on a MILP having two variables, it is common for such trees to include thousands or millions of nodes. Thus, the tree 900 in FIG. 9 is simply meant as a basic illustration of the tree concept. Embodiments according to this disclosure may traverse this tree in an attempt to find an optimal solution. In this embodiment, node 6 (970) has been shaded to indicate that the solution at that node is optimal. One goal of traversing the tree is to identify an optimal solution as quickly and efficiently as possible.

For example, an embodiment according to this disclosure may employ the learning phase and application phase branch-and-cut system described above with respect to FIG. 5B. In this simple example, the system 505 receives the MILP and executes preprocessing module 510 to perform presolve, an initial LP solve, and to perform heuristics and cut generation. Assuming that an optimal solution was not found by the preprocessing module, the system 505 moves to the learning phase branch-and-cut process 520. As discussed above, the learning phase branch-and-cut process establishes a threshold to limit the execution of the branch-and-cut process. For this simple example, the threshold is set at 3. The learning phase branch-and-cut process 520 executes and evaluates each node by traversing the tree, e.g., by evaluating node 0 (910), node 1 (920), node 2 (930), etc. When the learning phase branch-and-cut process identifies an infeasible node, it performs conflict analysis 540 at the infeasible node and collects the conflict information. For example, it may be that node 2 (930) is infeasible. Thus, the reason for the infeasibility is determined and node 2 (930) is cut from the tree.

When the learning phase branch-and-cut process has evaluated three nodes, it terminates. The system 505 executes the branch-and-cut restart module 530, which removes all of the nodes and restores the root node 910 (node 0). The conflict information is then used to prune the tree 900. In this case, the restored root node 910 would have a cut applied to it that would cut node 2 (930) at the outset. Thus, before the application phase begins, the tree 900 has been reduced in size and thus may be more quickly traversed. The application phase process then executes. As discussed above, the application phase process does not perform conflict analysis and does not use the thresholds. Thus, the application phase branch-and-cut process traverses the entire tree 900 (as modified by module 530) and ultimately finds node 6 (970) and determines it to be an optimal solution.

Alternatively, rather than using the system of FIG. 5B, a system according to FIG. 7A may be employed. In such a case, a MILP is received by the MILP evaluation module 720, which performs an initial solve on the MILP. If the solution is not optimal, the MILP evaluation module 720 generates and applies cuts to the MILP. For example, as in the example above, suppose that node 2 (930) is infeasible. Thus, the MILP evaluation module 720 may cut node 2 (930) and attempt to resolve the MILP. However, if additional, better cuts are needed, the system branches 770 to the sub-MILP evaluation module 730, which sets up a sub-MILP that includes the original MILP. The objectives for the new sub-MILP are selected such that they are different from the objectives of the original MILP. The sub-MILP is then solved and cuts are generated. In this case, the sub-MILP is able to generate a cut that cuts off nodes 3 (940) and 5 (960), but still does not find node 6 (970). The cuts from the sub-MILP are then applied to the original MILP and the MILP evaluation module again tries to solve the MILP. In this simple example, the MILP evaluation module, after applying the cuts to remove nodes 3 (940) and 5 (960) from the tree 900, is able to quickly traverse the tree 900 to node 6 (970) and to identify node 6 (970) solution as optimal.

Exemplary Hardware System

In the embodiments described herein, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

FIG. 1A depicts at 100 a computer-implemented environment in which users 102 can interact with a system 104 hosted on one or more servers 106 through a network 108. The system 104 contains software operations or routines. The users 102 can interact with the system 104 through a number of ways, such as over one or more networks 108. One or more servers 106 accessible through the network(s) 108 can host system 104. It should be understood that the system 104 could also be provided on a stand-alone computer for access by a user.

Figure 1B:
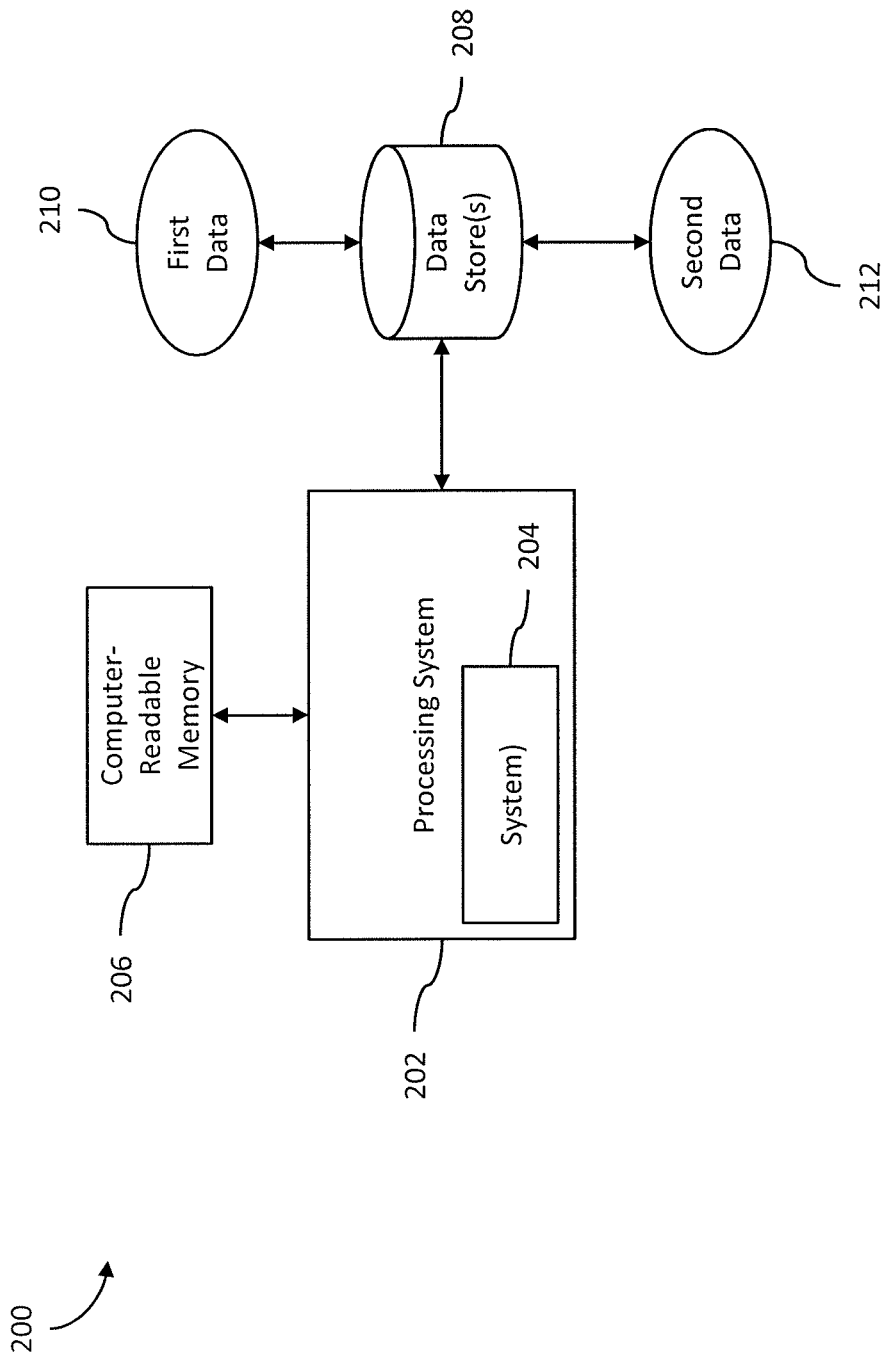
Figure 1C:
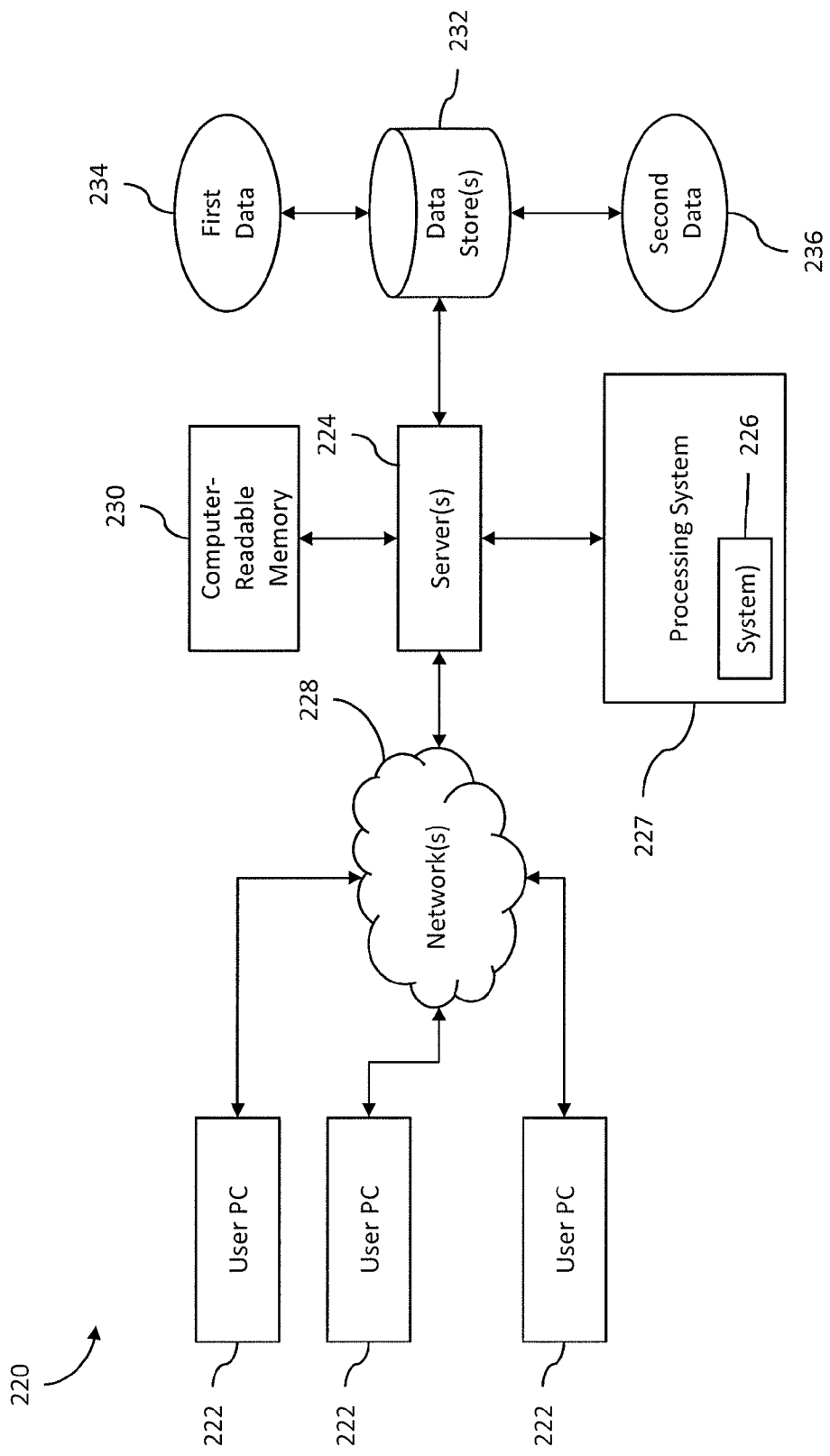

FIGS. 1B and 1C depict example systems for use in implementing a system. For example, FIG. 1B depicts an exemplary system 200 that includes a stand-alone computer architecture where a processing system 202 (e.g., one or more computer processors) includes a system 204 being executed on it. The processing system 202 has access to a computer-readable memory 206 in addition to one or more data stores 208. The one or more data stores 208 may contain first data 210 as well as second 212.

FIG. 1C depicts a system 220 that includes a client server architecture. One or more user PCs 222 accesses one or more servers 224 running a system 226 on a processing system 227 via one or more networks 228. The one or more servers 224 may access a computer readable memory 230 as well as one or more data stores 232. The one or more data stores 232 may contain first data 234 as well as second data 236.

FIG. 2 shows a block diagram of exemplary hardware for a stand-alone computer architecture 250, such as the architecture depicted in FIG. 1B, that may be used to contain and/or implement the program instructions of system embodiments according to this disclosure. A bus 252 may serve as the information highway interconnecting the other illustrated components of the hardware. A processing system 254 labeled CPU (central processing unit) (e.g., one or more computer processors), may perform calculations and logic operations required to execute a program. A processor-readable storage medium, such as read-only memory (ROM) 256 and random access memory (RAM) 258, may be in communication with the processing system 254 and may contain one or more programming instructions. Optionally, program instructions may be stored on a computer readable storage medium such as a magnetic disk, optical disk, recordable memory device, flash memory, or other physical storage medium.

A disk controller 260 interfaces one or more optional disk drives to the system bus 252. These disk drives may be external or internal floppy disk drives such as 262, external or internal CD-ROM, CD-R, CD-RW or DVD drives such as 264, or external or internal hard drives 266. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 260, the ROM 256 and/or the RAM 258. Preferably, the processor 254 may access each component as required.

A display interface 268 may permit information from the bus 256 to be displayed on a display 270 in audio, graphic, or alphanumeric format. Communication with external devices may optionally occur using various communication ports 272.

In addition to the standard computer-type components, the hardware may also include data input devices, such as a keyboard 272, or other input device 274, such as a microphone, remote control, pointer, mouse and/or joystick.

For example, the systems and methods may include data communications conveyed via networks (e.g., local area network, wide area network, Internet, combinations thereof, etc.), fiber optic medium, carrier waves, wireless networks, etc. for communication with one or more data processing devices. The data communications can carry any or all of the data disclosed herein that is provided to or from a device.

Additionally, the methods and systems described herein may be implemented on many different types of processing devices by program code having program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It will be appreciated that many processing capabilities in addition to those described are possible, without departing from the teachings according to the disclosed subject matter. Further, it should be noted that the methods, systems, and devices discussed above are intended merely to be examples. Various embodiments may omit, substitute, or add various procedures or components as appropriate. For example, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the disclosed subject matter.

Specific details are given in the description to provide a thorough understanding of the embodiments. However, it will be understood by one of ordinary skill in the art that the embodiments may be practiced without these specific details.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional operations not included in the figures.

Other variations are within the spirit of the present disclosed subject matter. Thus, while the disclosed subject matter is susceptible to various modifications and alternative constructions, certain illustrated embodiments thereof are shown in the drawings and have been described above in detail. It should be understood, however, that there is no intention to limit the disclosed subject matter to the specific form or forms disclosed, but on the contrary, the intention is to cover all modifications, alternative constructions, and equivalents falling within the spirit and scope of the disclosed subject matter, as defined in the appended claims.

Many of the methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosed subject matter and does not pose a limitation on the scope of the disclosed subject matter unless otherwise claimed.

Thus, particular embodiments have been described. Other embodiments are within the scope of the following claims. For example, the actions recited in the claims can be performed in a different order and still achieve desirable results.

That which is claimed is:

1. A computer-program product, tangibly embodied in a non-transitory machine-readable storage medium, including instructions configured to cause a data processing apparatus to:
   receive a mixed integer linear problem (MILP), the MILP having one or more global bounds, the MILP having associated nodes;
   pre-process the MILP;
   establish a first threshold for a learning-phase branch-and-cut process;

perform a first phase of a two-phase branch-and-cut process, wherein the first phase is the learning phase branch-and-cut process for nodes associated with the MILP in a first branch-and-bound tree, and wherein performing the learning phase branch-and-cut process includes:
  evaluating the nodes associated with the MILP,
  collecting conflict information about the MILP;
  determining whether the first threshold has been reached,
  responsive to reaching the first threshold:
    pruning all of the nodes;
    restoring a root node of the MILP;
    updating one or more of the global bounds based on the collected conflict information;
    storing initial costs from the learning phase branch-and-cut process; and
perform a second phase of the two-phase branch-and-cut process after the first phase, wherein the second phase is an application phase branch-and-cut process for nodes associated with the MILP in a second branch-and-bound tree, and wherein performing the application phase branch-and-cut process includes:
  evaluating the restored root node; and
  solving the MILP using the restored root node, the stored initial costs, and the collected conflict information;
  wherein performing the application phase branch-and-cut process does not include collecting conflict information about the MILP or determining whether the first threshold has been reached.

2. The computer-program product of claim 1, wherein instructions to cause the data processing apparatus to perform a learning phase branch-and-cut process includes instructions to cause the data processing apparatus to determine an infeasible sub-problem.

3. The computer-program product of claim 1, wherein instructions to cause the data processing apparatus to evaluate the nodes associated with the MILP comprises instructions for identifying a conflict node, and wherein instructions to cause the data processing apparatus to collect conflict information comprises instructions to cause the data processing apparatus to:
  perform an infeasibility analysis on the identified conflict node to derive one or more conflict clauses based on the identified conflict node; and
  storing the one or more conflict clauses.

4. The computer-program product of claim 1, wherein instructions to cause the data processing apparatus to pre-process the MILP comprise instructions to cause the data processing apparatus to:
  determine and eliminate redundant constraints of the MILP; and
  determine and eliminate fixed variables of the MILP.

5. A system comprising:
  a computer-readable medium; and
  a processor in communication with the computer readable medium, the processor configured to read and execute instructions stored in the computer-readable medium to perform operations comprising:
    receiving a mixed integer linear problem (MILP), the MILP having a root node and one or more global bounds;
    pre-processing the MILP;
    establishing a first threshold for a learning-phase branch-and-cut process;
    performing a first phase of a two-phase branch-and-cut process, wherein the first phase is the learning phase branch-and-cut process on nodes associated with the MILP in a first branch-and-bound tree, and wherein performing the learning phase branch-and-cut process includes:
      evaluating a plurality of the nodes associated with the MILP,
      collecting conflict information about the MILP, and
      determining whether the first threshold has been reached;
    responsive to reaching the first threshold, pruning all of the nodes, restoring the root node of the MILP, updating one or more of the global bounds based on the collected conflict information, and storing initial costs from the learning phase branch-and-cut process; and
    perform a second phase of the two-phase branch-and-cut process after the first phase, wherein the second phase is an application phase branch-and-cut process for nodes associated with the MILP in a second branch-and-bound tree, and wherein performing the application phase branch-and-cut process includes:
      evaluating the restored root node; and
      solving the MILP using the restored root node, the stored initial costs, and the collected conflict information;
      wherein performing the application phase branch-and-cut process does not include collecting conflict information about the MILP or determining whether the first threshold has been reached.

6. The system of claim 5, wherein performing the learning phase branch-and-cut process comprises determining an infeasible sub-problem by determining a clause of the MILP evaluates as false.

7. The system of claim 5, wherein determining one or more conflict clauses comprises:
  identifying a conflict node;
  performing an infeasibility analysis on the conflict node;
  deriving one or more conflict clauses based on the conflict node; and
  storing the one or more conflict clauses.

8. The system of claim 5, wherein pre-processing the MILP comprises:
  determining and eliminating redundant constraints of the MILP; and
  determining and eliminating fixed variables.

9. The system of claim 5, further comprising establishing a second threshold, and wherein the learning phase branch-and-cut process further comprises determining whether the second threshold has been reached, and responsive to reaching either the first or second thresholds, removing all of the nodes and restoring the root node of the MILP.

10. A system comprising:
  a computer-readable medium; and
  a processor in communication with the computer readable medium, the processor configured to read and execute instructions stored in the computer-readable medium to perform a method, the method comprising:
    analyzing a mixed integer linear problem (MILP) to determine an initial linear problem (LP) solution, the analyzing includes determining whether the initial LP solution is non-optimal;
    responsive to determining the initial LP solution is non-optimal, generating a sub-MILP of the MILP;
    determining one or more new objectives of the sub-MILP, each of the one or more new objective different from the one or more objectives of the MILP, wherein determining the one or more objectives of the sub-MILP comprises:
  determining pseudo-costs associated with the sub-MILP;
  determining one or more high-impact variables based on the determined pseudo-costs, the one or more high-impact variables including a variable that can be held constant or whose bounds can be improved to reduce a solution time of the MILP; and
  changing a coefficient of at least one of the one or more high-impact variables;
  generating cuts based on the one or more new objectives;
  analyzing the sub-MILP based on the cuts to determine a new LP solution and new bounds; and
  solving the MILP based on the new LP solution and the new bounds.

11. The system of claim 10, wherein the one or more new objectives comprises an all-zero objective.

12. The system of claim 10, wherein the one or more new objectives comprises a randomly-selected objective.

13. The system of claim 10, wherein determining the one or more objectives of the sub-MILP comprises modifying one of the identified objectives.

14. The system of claim 10, wherein generating cuts comprises generating at least a cut that cuts multiple LPs.

15. The system of claim 10, further comprising storing the new bounds and the new LP solution.

16. A method comprising:
  receiving a mixed integer linear problem (MILP), the MILP having a root node and one or more global bounds;
  pre-processing the MILP, the MILP being associated with nodes;
  establishing a first threshold for a learning phase branch-and-cut process;
  performing, by one or more processors, a first phase of a two-phase branch-and-cut process, wherein the first phase is the learning phase branch-and-cut process for nodes associated with the MILP in a first branch-and-bound tree, and wherein performing the learning phase branch-and-cut process includes:
  evaluating the nodes associated with the MILP,
  collecting conflict information about the MILP, and
  determining whether the first threshold has been reached;
  responsive to reaching the first threshold, removing all of the nodes, restoring a root node of the MILP, updating one or more of the global bounds based on the collected conflict information, and storing initial costs from the learning phase branch-and-cut process; and
  perform a second phase of the two-phase branch-and-cut process after the first phase, wherein the second phase is an application phase branch-and-cut process for nodes associated with the MILP in a second branch-and-bound tree, and wherein performing the application phase branch-and-cut process includes:
  evaluating the restored root node; and
  solving, with the one or more processors, the MILP using the restored root node, the stored initial costs, and the collected conflict information
  wherein performing the application phase branch-and-cut process does not include collecting conflict information about the MILP or determining whether the first threshold has been reached.

17. The method of claim 16, further comprising outputting the collected conflict information to the application phase branch-and-cut process.

18. The method of claim 16, wherein the conflict information comprises one or more conflict clauses describing one or more infeasible nodes of the MILP.

19. The method of claim 16, further comprising establishing a second threshold, and wherein the learning phase branch-and-cut process further comprises:
  determining whether the second threshold has been reached, and responsive to reaching either the first or second threshold, removing all of the nodes and restoring the root node of the MILP.

20. The method of claim 19, wherein the first threshold is a conflict clause threshold and the second threshold is a nodes evaluated threshold, the conflict clause threshold indicating a maximum number of conflict clauses to be identified during the learning phase branch-and-cut process, and the nodes evaluated threshold indicating a maximum number of nodes to be evaluated during the learning phase branch-and-cut process.

21. The method of claim 16, wherein collecting conflict information about the MILP includes determining one or more conflict clauses.

22. The method of claim 16, wherein collecting conflict information about the MILP includes deleting one or more of the nodes associated with the MILP based upon determining that the one or more nodes associated with the MILP provide no solution for the MILP or a solution that is worse that a prior solution of the MILP.

23. The method of claim 16, wherein performing the learning phase branch-and-cut process includes determining an infeasible sub-problem by determining a clause of the MILP evaluates as false.

24. The method of claim 16, wherein evaluating the nodes associated with the MILP comprises identifying a conflict node, and wherein collecting conflict information includes:
  performing an infeasibility analysis on the identified conflict node to derive one or more conflict clauses based on the identified conflict node; and
  storing the one or more conflict clauses.

25. The method of claim 24, further comprising deleting the identified conflict node after storing the one or more conflict clauses.

26. The method of claim 16, wherein preprocessing the MILP includes:
  determining and eliminating redundant constraints of the MILP; and
  determining and eliminating fixed variables of the MILP.

27. The method of claim 16, wherein determining whether the first threshold has been reached comprises one of:
  determining whether a number of nodes evaluated meets or exceeds the first threshold,
  determining whether an amount of conflict information collected meets or exceeds the first threshold, or
  determining whether an elapsed time meets or exceeds the first threshold.

28. The method of claim 16, further comprising generating the nodes associated with the MILP to divide the MILP into smaller problems.

29. A method comprising:
  receiving, by one or more processors, a mixed integer linear problem (MILP), the MILP having one or more objectives;

analyzing, by one or more processors, the MILP to determine an initial linear problem (LP) solution, the analyzing includes determining whether the initial LP solution is non-optimal;

responsive to determining the initial LP solution is non-optimal, generating, by one or more processors, a sub-MILP of the MILP;

determining, by one or more processors, one or more objectives of the sub-MILP, each of the one or more objectives being different from the one or more objectives of the MILP, wherein determining the one or more objectives of the sub-MILP comprises:

determining pseudo-costs associated with the sub-MILP;

determining one or more high-impact variables based on the determined pseudo-costs, the one or more high-impact variables including a variable that can be held constant or whose bounds can be improved to reduce a solution time of the MILP; and changing a coefficient of at least one of the one or more high-impact variables;

generating, by one or more processors, cuts based on the one or more objectives of the sub-MILP;

analyzing, by one or more processors, the sub-MILP based on the cuts to determine a new LP solution and new bounds;

determine the new LP solution and the new bounds; and solving, by one or more processors, the MILP based on the cuts and the new bounds.

30. The method of claim 29, wherein the one or more new objectives comprises an all-zero objective.

31. The method of claim 29, wherein the one or more new objectives comprises a randomly-selected objective.

32. The method of claim 29, wherein determining the one or more new objectives of the sub-MILP comprises modifying one of the identified objectives.

33. The method of claim 29, wherein generating cuts comprises generating at least a cut that cuts multiple LPs.

34. The method of claim 29, further comprising storing the new bounds and the cuts.

35. A computer-program product, tangibly embodied in a non-transitory machine-readable storage medium, including instructions configured to cause a data processing apparatus to:

analyzing a mixed integer linear problem (MILP) to determine an initial linear problem (LP) solution, the analyzing includes determining whether the initial LP solution is non-optimal;

responsive to determining the initial LP solution is non-optimal, generating a sub-MILP of the MILP;

determining one or more objectives of the sub-MILP, each of the one or more objectives being different from the one or more objectives of the MILP, wherein determining the one or more objectives of the sub-MILP comprises:

determining pseudo-costs associated with the sub-MILP;

determining one or more high-impact variables based on the determined pseudo-costs, the one or more high-impact variables including a variable that can be held constant or whose bounds can be improved to reduce a solution time of the MILP; and changing a coefficient of at least one of the one or more high-impact variables;

generating cuts based on the one or more objectives of the sub-MILP;

analyzing the sub-MILP based on the cuts to determine a new LP solution and new bounds;

determine the new LP solution and the new bounds; and solving the MILP based on the new LP solution and the new bounds.

36. The computer-program product of claim 35, wherein the one or more new objectives comprises an all-zero objective.

37. The computer-program product of claim 35, wherein the one or more new objectives comprises a randomly-selected objective.

38. The computer-program product of claim 35, wherein determining the one or more objectives of the sub-MILP comprises modifying one of the identified objectives.

39. The computer-program product of claim 35, wherein generating cuts comprises generating at least a cut that cuts multiple LPs.

40. The computer-program product of claim 35, further comprising storing the new bounds and the new LP solution.

* * * * *